US012543075B2

(12) United States Patent
Jha et al.

(10) Patent No.: US 12,543,075 B2
(45) Date of Patent: Feb. 3, 2026

(54) METHOD AND MULTI SIM UE FOR MANAGING DATA SESSION IN WIRELESS NETWORK

(71) Applicant: Samsung Electronics Co., Ltd., Suwon-si (KR)

(72) Inventors: Kailash Kumar Jha, Bangalore (IN); Alok Kumar Jangid, Bangalore (IN); Nishant, Bangalore (IN); Sidhant Jain, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 879 days.

(21) Appl. No.: 17/515,029

(22) Filed: Oct. 29, 2021

(65) Prior Publication Data

US 2022/0141720 A1 May 5, 2022

Related U.S. Application Data

(63) Continuation of application No. PCT/KR2021/015218, filed on Oct. 27, 2021.

(30) Foreign Application Priority Data

Oct. 30, 2020 (IN) .............................. 202041047410
Aug. 5, 2021 (IN) .............................. 202041047410

(51) Int. Cl.
*H04W 36/00* (2009.01)
*H04B 7/06* (2006.01)
(Continued)

(52) U.S. Cl.
CPC ....... *H04W 36/0027* (2013.01); *H04W 8/183* (2013.01); *H04W 36/00226* (2023.05);
(Continued)

(58) Field of Classification Search
CPC ............. H04W 36/0027; H04W 8/183; H04W 36/0022; H04W 60/005; H04W 88/06; H04B 7/0626
See application file for complete search history.

(56) References Cited

U.S. PATENT DOCUMENTS

2015/0094071 A1* 4/2015 Hang ..................... H04W 76/19
455/450
2015/0373661 A1* 12/2015 Fulzele ............... H04L 65/1073
455/435.2
(Continued)

FOREIGN PATENT DOCUMENTS

EP        4128989 A1    2/2023
WO    2017053005 A1    3/2017
(Continued)

OTHER PUBLICATIONS

Examination report dated May 10, 2022, in connection with Indian Application No. 202041047410, 7 pages.
(Continued)

*Primary Examiner* — Joseph E Avellino
*Assistant Examiner* — Anindita Sen

(57) ABSTRACT

Embodiments herein disclose a method for managing a data session of a user equipment (UE) including multiple subscriber identity modules (SIMS) in a dual-connectivity wireless network. The method includes identifying, by the UE, initiation of a voice call over a first network on a first SIM of the multiple SIMs while at least one data session is ongoing on the first network associated with a second SIM of the multiple SIMS, the second SIM being connected with the first network and a second network included in the dual-connectivity wireless network. Further, the method includes shifting, by the UE, the at least one data session to the second network associated with the second SIM in response to identifying that the voice call over the first
(Continued)

network on the first SIM is initiated, identifying, by the UE, whether the voice call over the first network initiated on the first SIM is ended, and shifting, by the UE, the at least one data session to the first network associated with the second SIM, in response to identifying that the voice call over the first network initiated on the first SIM is ended.

18 Claims, 19 Drawing Sheets

(51) Int. Cl.
    *H04W 8/18*     (2009.01)
    *H04W 60/00*     (2009.01)
    *H04W 88/06*     (2009.01)

(52) U.S. Cl.
    CPC ......... *H04W 60/005* (2013.01); *H04W 88/06* (2013.01); *H04B 7/0626* (2013.01)

(56) References Cited

U.S. PATENT DOCUMENTS

| | | |
|---|---|---|
| 2016/0029199 A1 | 1/2016 | Shi et al. |
| 2016/0029222 A1* | 1/2016 | Su ........................ H04W 16/14 370/329 |
| 2017/0150502 A1 | 5/2017 | Chirala et al. |
| 2017/0347294 A1* | 11/2017 | Sagar .................... H04W 24/08 |
| 2018/0098238 A1* | 4/2018 | Saxena ............. H04W 36/0066 |
| 2018/0160422 A1* | 6/2018 | Pathak .................. H04W 76/10 |
| 2018/0183655 A1 | 6/2018 | Gupta et al. |
| 2020/0015303 A1 | 1/2020 | Tsai et al. |
| 2020/0245292 A1* | 7/2020 | Huang .................. H04W 68/12 |
| 2020/0304984 A1* | 9/2020 | Dhanapal ............ H04W 56/001 |
| 2021/0014667 A1* | 1/2021 | Lovlekar ............... H04W 88/06 |

FOREIGN PATENT DOCUMENTS

| | | | |
|---|---|---|---|
| WO | WO-2020045952 A1 * | 3/2020 | .......... H04B 1/0064 |
| WO | 2022246751 A1 | 12/2022 | |

OTHER PUBLICATIONS

International Search Report and Written Opinion of the International Searching Authority dated Feb. 4, 2022, in connection with International Application No. PCT/KR2021/015218, 8 pages.

Supplementary European Search Report dated Jan. 8, 2024, in connection with European Patent Application No. 21886799.2, 10 pages.

VIVO (Moderator), "Proposal for 2nd phase of email discussion on Muiti-SIM REL-17 work", RP-192297, 3GPP TSG-RAN WG Meeting #85, Newport Beach, USA, Sep. 16-20, 2019, 1 page.

* cited by examiner

| LCG ID | R | R | R | Type |
|---|---|---|---|---|

LCG ID = Logical channel ID
R = Reserved bit
Type = Bearer type

FIG.6C

METHOD AND MULTI SIM UE FOR MANAGING DATA SESSION IN WIRELESS NETWORK

CROSS-REFERENCE TO RELATED APPLICATIONS

This application is a continuation application, claiming priority under § 365(c), of an International application No. PCT/KR2021/015218, filed on Oct. 27, 2021, which was based on and claimed the benefit of an Indian Provisional patent application Serial number 202041047410, filed on Oct. 30, 2020, and an Indian Complete patent application Serial number 202041047410, filed on Aug. 5, 2021, in the Indian Intellectual Property Office, the disclosures of each of which is incorporated by reference herein in its entirety.

BACKGROUND

1. Field

The present disclosure relates to wireless communications and more particularly to methods and multi subscriber identity module (SIM) user equipment (UE) for managing data sessions in a wireless network.

2. Description of Related Art

In the domain of wireless communication, at any given point in time there can be multiple devices associated with a cell, where some of the devices support a single subscriber identity module (SIM) mode and some other devices support a dual SIM dual standby (DSDS) mode. A network will not be able to identify whether the device is working in the single SIM mode or in the dual SIM mode. Further, a device in the dual SIM mode may support Evolved UMTS Terrestrial Radio Access Network (E-UTRAN) New Radio Dual Connectivity (ENDC) on any of the SIMs.

The ENDC devices include separate radio frequency (RF) transceivers (TRX) for each of a New Radio (NR) leg and a Long Term Evolution (LTE) leg. The TRX for the NR leg and the TRX for the LTE leg operate simultaneously in both of the legs. Therefore, most of the DSDS devices with ENDC support (on one SIM) have two transmitters (2Tx) and four receivers (4Rx). In DSDS configuration, with the ENDC support on one of the SIMs, one Transmitter (Tx) will be used for the ENDC NR leg and other Tx will be used (shared) by both the ENDC LTE leg and the LTE connection of the other SIM (as shown in FIG. 1A). Further, the RF connection needs to be tuned away to provide services to different SIMs. The LTE Tx must be tuned away to the other SIM whenever any signaling is to be performed on it.

In DSDS operation, during a voice over LTE (VoLTE) call on one of the SIMs, another SIM can be in a data session simultaneously. But, the VoLTE call has higher priority than the data session. Further, VoLTE packets follow semi-persistent scheduling, where packets are sent and received periodically at fixed intervals (usually 20 ms). So, the RF must be tuned away for the transmission/reception of the VoLTE packets after every interval so that voice packets are transmitted/received without delay and without performance degradation even when another SIM is in the data session.

Consider a DSDS scenario, where the VoLTE call is ongoing on a first SIM and an ENDC data session is ongoing on a second SIM, as indicated in FIG. 1B. The LTE transceivers in a UE will be shared for the VoLTE call as well as for the data (LTE data in ENDC). As VoLTE packets are of higher priority, the RF is always tuned away at a fixed interval for the VoLTE packets transmission/reception to ensure that the voice packets are transmitted/received without delay and without performance degradation even when the second SIM is in the data session. However, during this RF blackout of the second SIM, the network will keep allocating downlink (DL)/uplink (UL) resources to the second SIM. As a result, the LTE leg on the ENDC SIM will have more Physical Data Shared Channel (PDSCH) fails/retransmissions (as ACKs will not be sent during the tune-away) than the NR leg, reducing the overall throughput. The data transmission on the NR leg will not be much impacted due to use of a separate transceiver, and will continue to work even during the tune-away period for the VoLTE call. But since the LTE data is impacted, the overall throughput will be impacted.

Any transmissions or receptions during the tune-away period on the LTE leg of the second SIM will not be performed as the RF is not available. Therefore, data loss occurs during the tune-away period for the second SIM. The data transmission on the second SIM will resume for the LTE leg only after the transceivers are tuned back after the VoLTE scheduling.

Thus, it is desired to address the above mentioned disadvantages or other shortcomings or at least provide a useful alternative.

SUMMARY

Accordingly the embodiments herein disclose a method for managing data session of a user equipment (UE) including multiple subscriber identity modules (SIMS) in a dual-connectivity wireless network. The method includes identifying, by the UE, initiation of a voice call over a first network on a first SIM of the multiple SIMS while at least one data session is ongoing on the first network associated with a second SIM of the multiple SIMs, the second SIM being connected with the first network and a second network included in the dual-connectivity wireless network, and shifting, by the UE, the at least one data session in the second network associated with the second SIM, in response to identifying that the voice call over the first network on the first SIM is initiated. Further, the method also includes identifying, by the UE, whether the voice call over the first network initiated on the first SIM is ended, and shifting, by the UE, the at least one data session to the first network associated with the second SIM, in response to identifying that the voice call over the first network initiated on the first SIM is ended.

In an embodiment, the first network is 4th generation (4G) network and the second network is 5th generation (5G) network, and the second SIM is connected to the 4G Network as a master cell roup (MCG) and the second SIM is connected to the 5G Network as a secondary cell group (SCG).

In an embodiment, a 4th generation (4G) transmitter of the UE is used in association with the first SIM and the second SIM, and a 5th generation (5G) transmitter of the UE is used in association with the second SIM.

In an embodiment, shifting, by the UE, the at least one data session to the second network associated with the second SIM, in response to identifying that the voice call over the first network on the first SIM is ongoing includes sending, by the UE, a request to a master cell group (MCG) entity of the first network to convert at least one of an uplink (UL) split bearer configuration and a downlink (DL) split bearer configuration to a secondary cell group (SCG) bearer in response to the request, and shifting the at least one data session to the second network associated with the second SIM for sending and receiving data of the at least one data session during the voice call over the first network on the first SIM. The request is sent as one of a UEAssistanceInformation message, or a medium access control (MAC) control element (CE) with a logical control identifier (ID) and a data radio bearer (DRB) ID.

In an embodiment, shifting, by the UE, the at least one data session to the first network associated with the second SIM, in response to identifying that the voice call over the first network initiated on the first SIM is ended includes identifying, by the UE, one or more downlink data packets received during the voice call that causes a periodic transceiver tune away. Further, the method includes sending, by the UE, a cumulative acknowledgement for the one or more downlink data packets and shifting the at least one data session to the first network associated with the second SIM, in response to identifying that the voice call over the first network on the first SIM is ended.

In an embodiment, shifting, by the UE, the at least one data session to the second network associated with the second SIM, in response to identifying that the voice call over the first network on the first SIM is initiated includes sending, by the UE to a master cell group (MCG) entity of the first network, an indication of radio frequency (RF) tuning away, and shifting, by the UE, the at least one data session to the second network associated with the second SIM for sending and receiving data of the at least one data session during the voice call over the first network on the first SIM. The indication of RF tuning away is a channel state information (CSI) report indicating the RF tuning away. The CSI report indicating RF tuning away is sent using L1 signaling with a channel quality indicator (CQI) value set to a preset value.

Accordingly the embodiments herein disclose a user equipment (UE) including multiple subscriber identity modules (SIMs) in a dual-connectivity wireless network. The UE includes a transceiver and at least one processor coupled to the transceiver. The at least one processor is configured to identify initiation of a voice call over a first network on a first SIM of the multiple SIMs while at least one data session is ongoing on a first network associated with a second SIM of the multiple SIMS. The second SIM is connected to the first network and a second network included in the dual-connectivity wireless network. Further, the at least one processor is further configured to shift the at least one data session in the second network associated with the second SIM, in response to an identification that the voice call over the first network on the first SIM is initiated. Further, the at least one processor is also configured to identify whether the voice call over the first network initiated on the first SIM is ended, and shift the at least one data session to the first network associated with the second SIM, in response to an identification that the voice call over the first network initiated on the first SIM is ended.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIG. 6C illustrates a structure of the MAC Control Element sent by the multi SIM UE to a network for initiating the conversion of a radio bearer, according to the embodiments as disclosed herein;

DETAILED DESCRIPTION

Figure 1A:
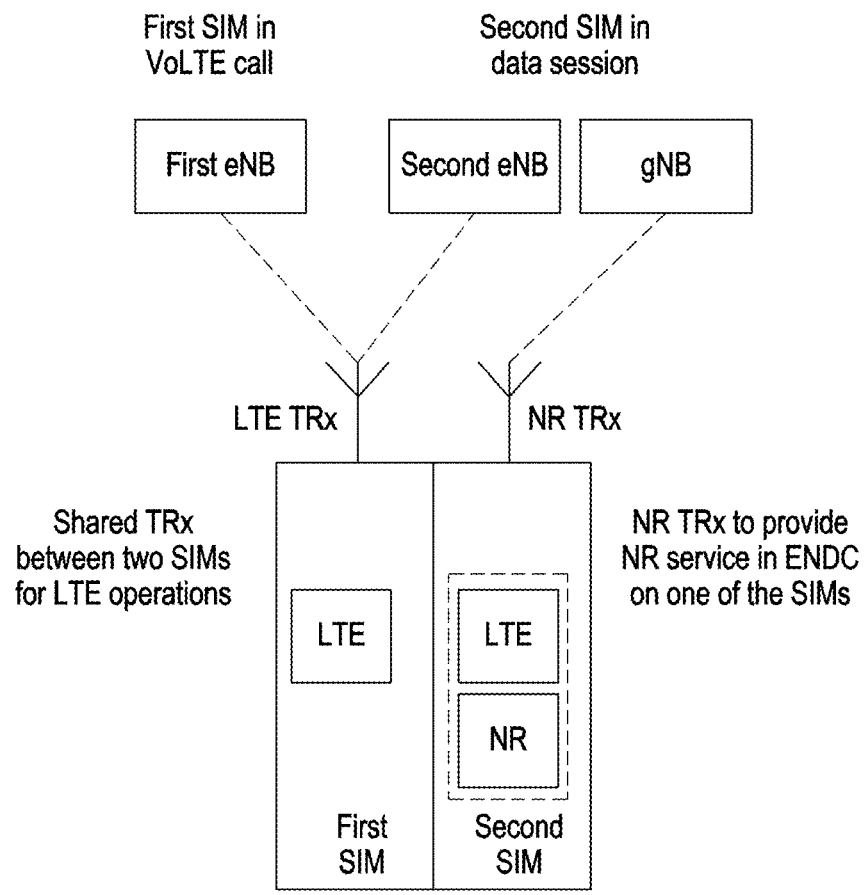
FIG. 1A illustrates a multi SIM user equipment with a first SIM on a VoLTE call and a second SIM on an ENDC data session, according to the prior art.
Figure 1B:
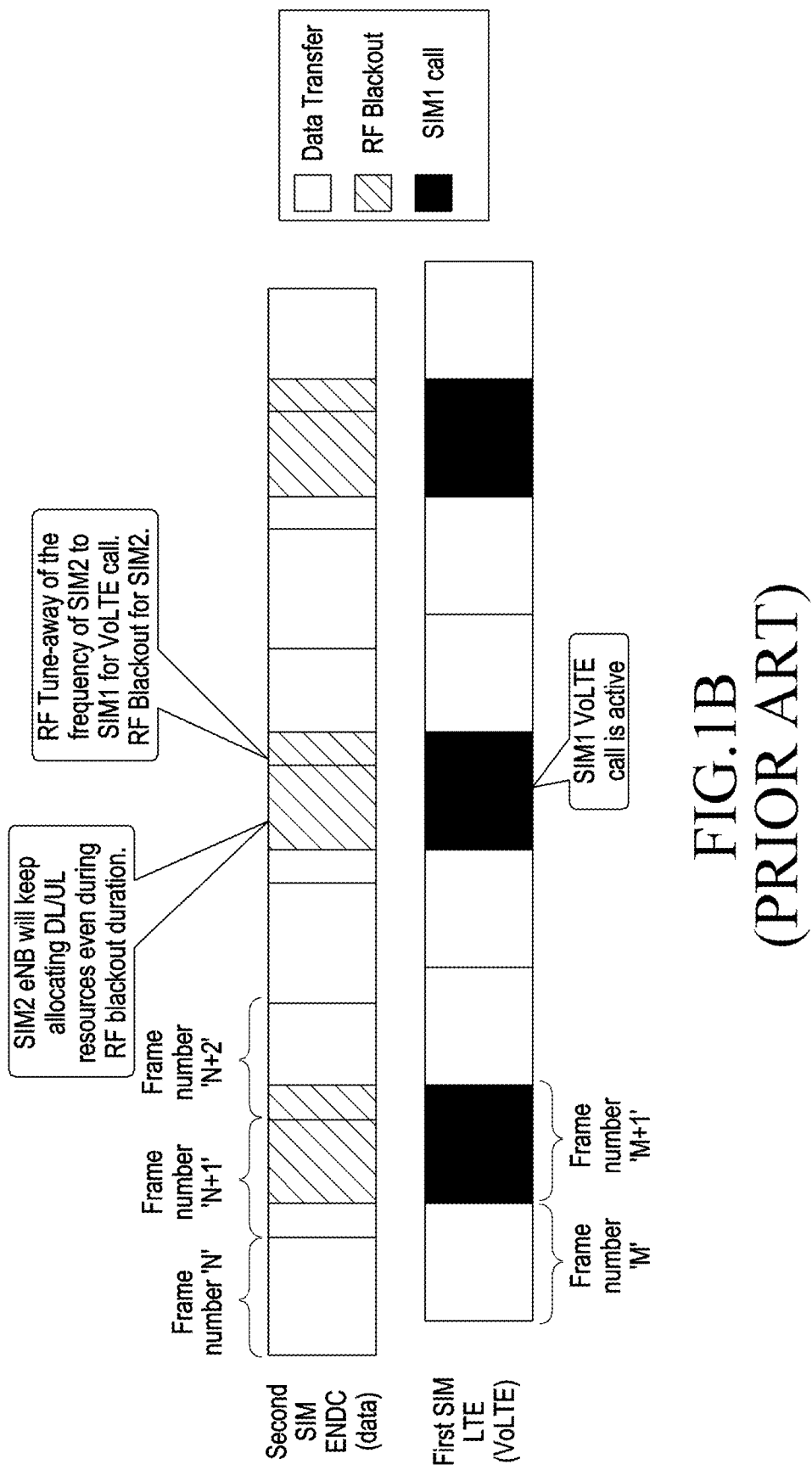
FIG. 1B illustrates a scenario of network allocating resources to the second SIM during RF blackout, according to the prior art.

FIGS. 1A through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly the embodiments herein disclose a method for managing data session of a user equipment (UE) including multiple subscriber identity modules (SIMS) in a dual-connectivity wireless network. The method includes identifying, by the UE, initiation of a voice call over a first network on a first SIM of the multiple SIMs while at least one data session is ongoing on a first network associated with a second SIM of the multiple SIMs, and shifting, by the UE, the at least one data session in the second network associated with the second SIM, in response to identifying that the voice call over the first network on the first SIM is initiated. The second SIM is connected to the first network and the second network included in the dual-connectivity wireless network. Further, the method also includes identifying, by the UE, whether the voice call over the first network initiated on the first SIM is ended, and shifting, by the UE, the at least one data session to the first network associated with the second SIM, in response to identifying that the voice call over the first network initiated on the first SIM is ended.

Accordingly the embodiments herein disclose a user equipment (UE) including multiple subscriber identity modules (SIMs) for managing data session in a dual-connectivity wireless network. The UE includes a transceiver and at least one processor coupled to the transceiver. The at least one processor is configured to identify initiation of a voice call over a first network on a first SIM of the multiple SIMS while at least one data session is ongoing on the first network associated with a second SIM of the multiple SIMS. The second SIM is connected to the first network and a second network included in the dual-connectivity wireless network. Further, the at least one processor is configured to shift the data session in the second network associated with the second SIM, in response to an identification that the voice call over a first network on the first SIM is initiated. Further, the at least one processor is also configured to identify whether the voice call over the first network initiated on the first SIM is ended, and shift the at least one data session in the first network associated with the second SIM, in response to an identification that the voice call over a first network initiated on the first SIM is ended.

In the conventional methods and systems, when there is a VoLTE call on the first SIM and ENDC data transfer on the second SIM, frequent RF transceiver tune-away to the frequency for the VoLTE packet transmission is performed. This results in an RF blackout for the second SIM during the tune-away period, and no data packets can be received or transmitted by the second SIM on LTE due to the transceiver unavailability. As a result, multiple data packets are lost, leading to multiple retransmissions, low throughput, network resource wastage, and poor user experience.

Unlike conventional methods and systems, in the proposed method, the multi SIM UE indicates to the network to convert a split bearer to an SCG-only bearer in the second SIM which supports the ENDC data session when a VoLTE call is started on the first SIM. Therefore, any data transfer on the LTE leg of the second SIM is avoided for the duration of the VoLTE call.

Unlike conventional methods and systems, in the proposed method, the multi SIM UE receives downlink packets during the RF tune-away period using other receivers (Rx) and sends a cumulative acknowledgement (ACK) for the downlink packets received during tune-away later, once the transceiver is available after RF tune-back.

Therefore, the proposed method reduces DL packet loss in DSDS devices in the second SIM when the VoLTE call is ongoing on the first SIM. Further, the proposed method reduces the wastage of crucial network resources due to the avoidance of a number of retransmissions. As a result, the overall user experience is improved due to a reduction in packet loss and the delay caused thereby.

Referring now to the drawings, and more particularly to FIGS. 2 through 9, where similar reference characters denote corresponding features consistently throughout the figures, there are shown preferred embodiments. Hereinafter, a UE including multiple SIMs is referred to as a multi SIM UE.

Figure 2:
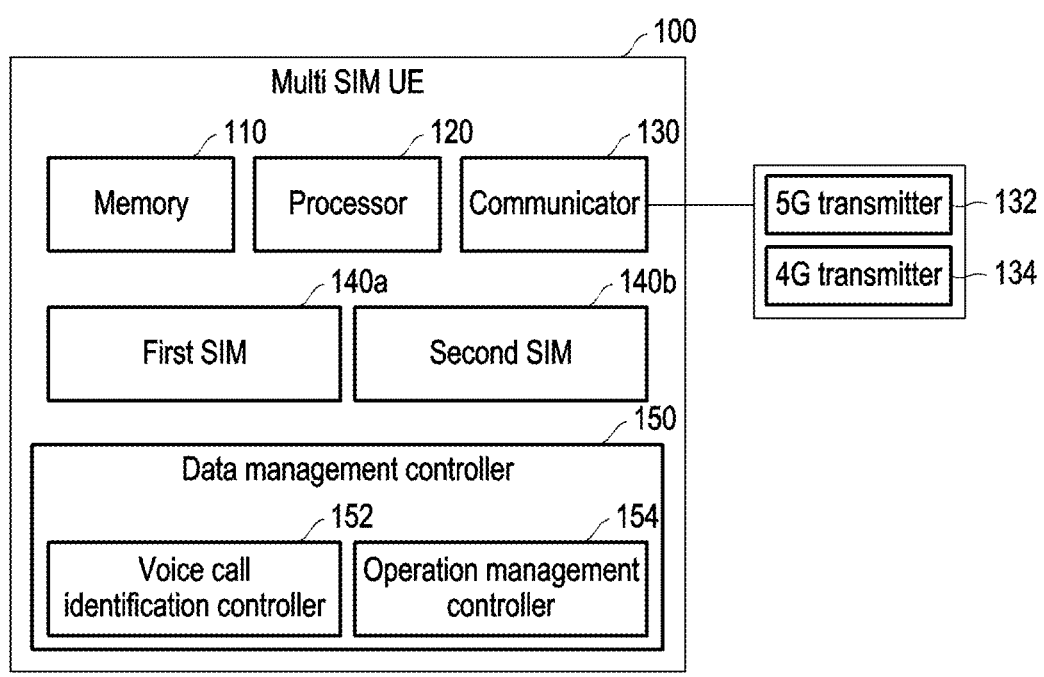
FIG. 2 is a block diagram of a multi SIM UE for managing data sessions in a wireless network, according to the embodiments as disclosed herein.

FIG. 2 is a block diagram of a multi SIM UE (100) for managing data sessions in a wireless network, according to the embodiments as disclosed herein. The wireless network may be a dual-connectivity (DC) wireless network.

Referring to FIG. 2, the multi SIM UE (100) is, for example, but not limited to, a mobile phone, a laptop, a smart phone, a personal digital assistant (PDA), a tablet, a wearable device, or the like. In an embodiment, the UE (100) includes a memory (110), a processor (120), a communicator (130), a first SIM (140a), a second SIM (140b) and a data management controller (150).

The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted to mean that the memory (110) is non-movable. In some examples, the memory (110) is configured to store larger amounts of information. In certain examples, a non-transitory storage medium may store data that may, over time, change (e.g., in random access memory (RAM) or cache).

The processor (120) is coupled with the memory (110), the communicator (130) and the data management controller (150). The processor (120) may include one or more processors. The one or more processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (120) may include multiple cores, and is configured to execute the instructions stored in the memory (110).

The communicator (130) includes an electronic circuit specific to a standard that enables wired or wireless communication. The communicator (130) is configured to communicate internally between internal hardware components of the multi SIM UE (100) and with external devices via one or more networks.

In an embodiment, the data management controller (150) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors. The data management controller (150) includes a voice call identification controller (152) and an operation management controller (154). The multi SIM UE (100) includes a 5th generation (5G) transmitter (e.g., an NR transmitter) and a 4th generation (4G) transmitter (e.g., an LTE transmitter) that are shared by the first SIM (140a) and the second SIM (140b). For example, the 5G transmitter (132) and the 4G transmitter (134) may be included in the communicator (130).

In an embodiment, the voice call identification controller (152) is configured to determine initiation of a voice call on the first SIM (140a) when a data session is ongoing on a first network associated with a second SIM (140b) of the multi SIM UE (100), and indicate the same to the operation management controller (154). The second SIM (140b) is capable of dual connectivity. Further, the voice call identification controller (152) is also configured to determine when the voice call on the first SIM (140a) is ended, and indicate the same to the operation management controller (154). The first network is a 4G network and the second network is a 5G network, and the second SIM (140b) of the multi SIM UE (100) is connected to the 4G Network as a master cell group (MCG) and to the 5G Network as a secondary cell group (SCG).

In an embodiment, the operation management controller (154) is configured to send a first request to the wireless network (e.g., to the MCG of a dual-connectivity wireless network) to convert an uplink (UL) split bearer configuration or a downlink (DL) split bearer configuration to an SCG-only bearer configuration to shift the data session to the second network associated with the second SIM (140*b*). The first request is sent as one of a UEAssistanceInformation message, a channel state information (CSI) report indicating RF tuning away, or a medium access control (MAC) control element (CE) with a logical control identifier (ID) and data radio bearer (DRB) ID. The CSI report indicating RF tuning away is sent using L1 signaling (control signaling related to they physical layer) with a channel quality indicator (CQI) value set to a preset value (e.g 0). Further, the operation management controller (154) is configured to determine that the conversion of the split bearer configuration to the SCG-only bearer configuration by the wireless network has occurred, and operate the data session in the second network associated with the second SIM (140*b*) by using the 5G transmitter associated with the second SIM (140*b*) for sending and receiving data during the voice call on the first SIM (140*a*).

In another embodiment, the operation management controller (154) is configured to determine (or identify) downlink data packets that are received on one receiver of multiple receivers during the voice call, during a periodic RF transceiver tune-away. Further, the operation management controller (154) is configured to send a cumulative ACK for the downlink data packets that were received on the receiver during the voice call (during the periodic transceiver tune-away), upon determining that the voice call on the first SIM (140*a*) is ended (and the RF transceiver has tuned back), and to operate the data session in the first network associated with the second SIM (140*b*) thereafter.

Further, the operation management controller (154) is configured to operate the data session in the first network associated with the second SIM (140*b*) upon receiving an indication from the voice call identification controller (152) that the voice call on the first SIM (140*a*) is ended.

Although FIG. 2 shows some hardware elements of the UE (100), it is to be understood that other embodiments are not limited thereto. In other embodiments, the UE (100) may include less or more elements. Further, the labels or names of the elements are used only for illustrative purposes and do not limit the scope of the invention. One or more components may be combined together to perform the same or substantially similar function.

Figure 3:
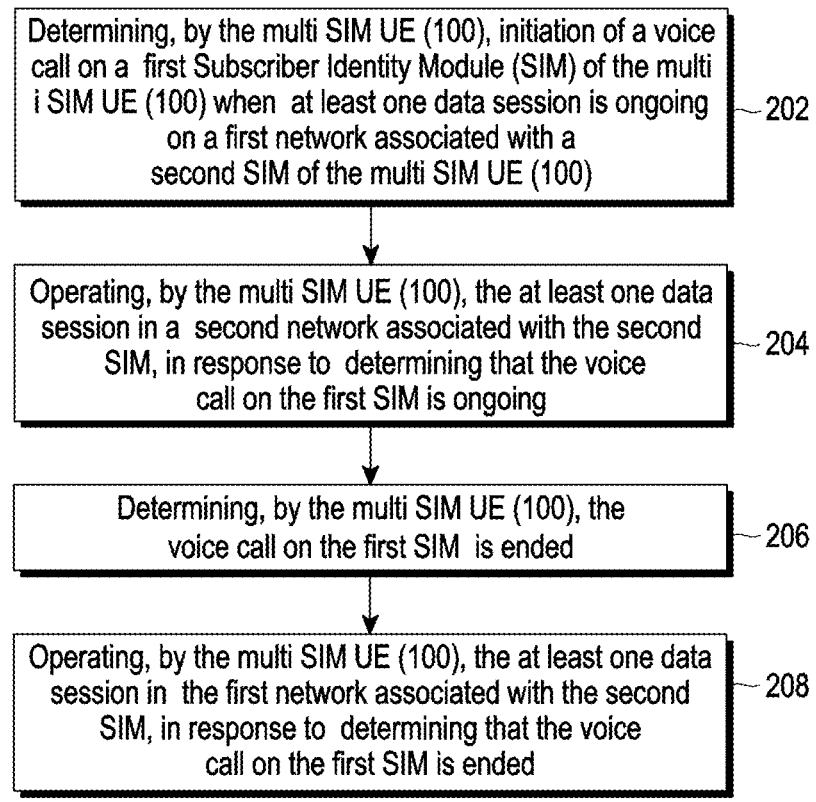
FIG. 3 is a flow chart illustrating a method for managing the data sessions of the multi SIM UE in the wireless network, according to the embodiments as disclosed herein.

FIG. 3 is a flow chart illustrating a method for managing the data sessions of the multi SIM UE (100) in the wireless network, according to the embodiments as disclosed herein. The wireless network may be a dual-connectivity wireless network.

Referring to FIG. 3, at step 202, the method includes determining, by the multi SIM UE (100), initiation of a voice call on the first SIM (140*a*) of the multi SIM UE (100) when a data session is ongoing on a first network associated with the second SIM (140*b*) of the multi SIM UE (100). For example, in the multi SIM UE (100) as illustrated in FIG. 2, the data management controller (150) may be configured to determine the initiation of the voice call on the first SIM (140*a*) of the multi SIM UE (100) when the data session is ongoing on the first network associated with the second SIM (140*b*) of the multi SIM UE (100).

At step 204, the method includes operating, by the multi SIM UE (100), the data session in a second network associated with the second SIM (140*b*), in response to determining that the voice call on the first SIM (140*a*) is ongoing. For example, in the multi SIM UE (100) as illustrated in the FIG. 2, the data management controller (150) may be configured to operate the data session in the second network associated with the second SIM (140*b*), in response to determining that the voice call on the first SIM (140*a*) is ongoing. The first network and second network may be an MCG and SCG of the dual-connectivity wireless network.

At step 206, the method includes determining, by the multi SIM UE (100), that the voice call on the first SIM (140*a*) is ended. For example, in the multi SIM UE (100) as illustrated in FIG. 2, the data management controller (150) may be configured to determine that the voice call on the first SIM (140*a*) is ended.

At step 208, the method includes operating, by the multi SIM UE (100), the data session in the first network associated with the second SIM (140*b*), in response to determining that the voice call on the first SIM (140*a*) is ended. For example, in the multi SIM UE (100) as illustrated in FIG. 2, the data management controller (150) may be configured to operate the data session in the first network associated with the second SIM (140*b*), in response to determining that the voice call on the first SIM (140*a*) is ended.

The various actions, acts, blocks, steps, or the like in the method may be performed in the order presented, in a different order, or simultaneously. Further, in some embodiments, some of the actions, acts, blocks, steps, or the like may be omitted, added, modified, skipped, or the like without departing from the scope of the invention.

Figure 4A:
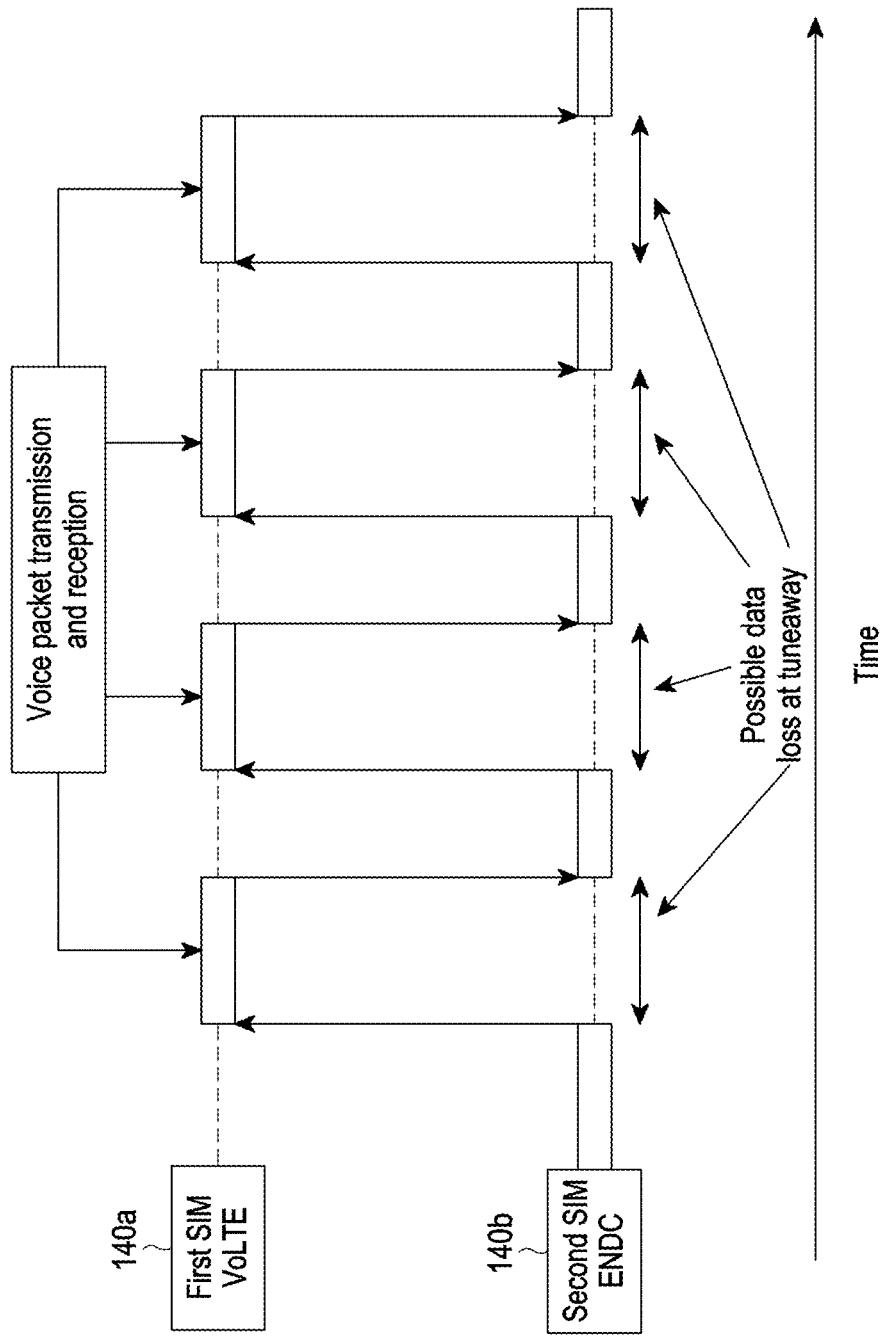
FIG. 4A is an example illustrating data loss due to RF tune-away during an ongoing VoLTE call, according to the prior art.

FIG. 4A is an example illustrating data loss due to the RF tune-away during an ongoing VoLTE call, according to the prior art.

Consider a scenario where a VoLTE call is ongoing on the first SIM (140*a*) and ENDC data transfer is ongoing on the second SIM (140*b*). Since the second SIM (140*b*) is performing the ENDC data transfer, the data will be transferred on both the LTE leg and the NR leg.

Further, the LTE (4G) transceivers will be used for the VoLTE call on the first SIM (140*a*) while the data (LTE data in the ENDC) transfer is ongoing on the second SIM (140*b*). Since the VoLTE packets are of higher priority than the LTE data, the transceivers must be tuned to the operator frequency of the first SIM (140*a*) for the transmission of the VoLTE packets. Further, if any data is to be sent on the LTE leg of the second SIM (140*b*) simultaneously, then the data cannot be sent until the transceivers are tuned back after the VoLTE scheduling. Due to the high priority provided to the VoLTE packets and the fixed interval of the VoLTE packet scheduling, tune-away between the frequencies of the first SIM (140*a*) and the second SIM (140*b*) is frequently performed. Thus the LTE leg will have more PDSCH fails/retransmissions on the second SIM (140*b*) than the NR leg, as ACKs for received data packets on the LTE leg cannot be sent during the tune-away. As a result of these PDSCH fails/retransmissions, the overall data speed is reduced on the second SIM (140*b*).

The data transmission on the NR leg of the second SIM (140*b*) will not be much impacted due to use of a separate transceiver (a 5G NR transceiver), and continues to work even during the tune-away period for the VoLTE. Due to the impact of the tune-away on the LTE data transmission, however, an overall TP of the ENDC data transfer is impacted.

Referring to FIG. 4A, consider periodic RF tune-away to the frequency for the VoLTE transmission and reception. Any transmissions by the network during the RF tune-away period on the second SIM (140b) will not be received by the multi SIM UE (100), as the RF is not available. Therefore, data loss occurs during the tune-away period for the second SIM (140b).

Conventionally, VoLTE voice packet transmission and reception takes place every 20 ms. Therefore, the ENDC throughput on the second SIM (140b) is very low, and there is also high network resource wastage.

Figure 4B:
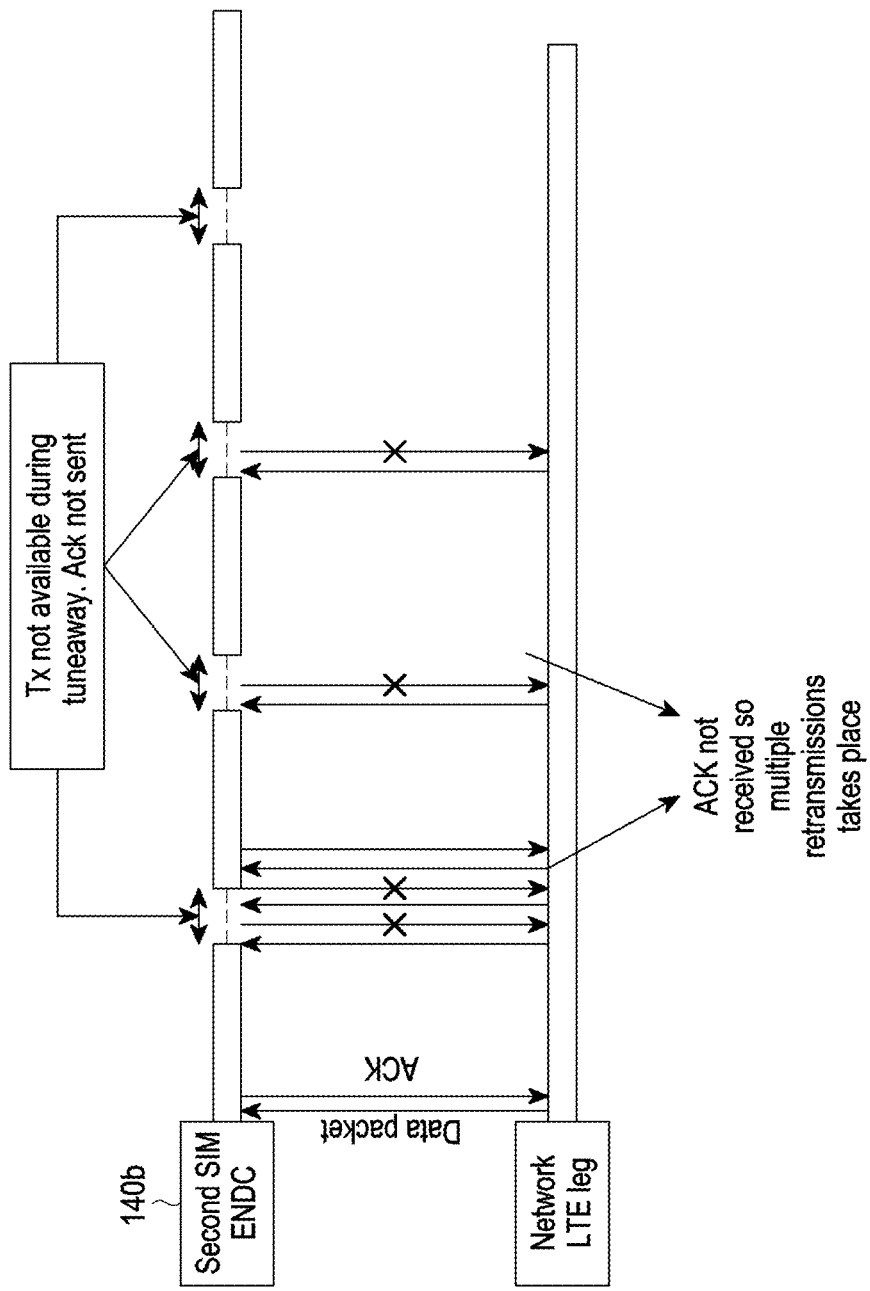
FIG. 4B is an example illustrating multiple retransmissions of data packets during the RF tune-away period, according to the prior art.

FIG. 4B is an example illustrating multiple retransmissions of data packets during the RF tune-away period, according to the prior art.

Referring to FIG. 4B in conjunction with FIG. 4A, a scenario of the multiple retransmissions during the RF tune-away period for the VoLTE call is provided. During the RF tune-away period, any transmissions by the network to the second SIM (140b) will not be received by the multi SIM UE (100) as the RF is not available. As a result, acknowledgements (ACKs) for any data scheduled by the network during the RF tune-away period, and for the packets received prior to the tune-away period, cannot be sent due to the unavailability of the transmitter during the tune-away period. Therefore, from the network end a high number of retransmissions take place for the same packets during tune-away period until the ACK is sent by the multi SIM UE (100) after the tune-back. As a result, there is lower throughput and network resource wastage.

Figure 5A:
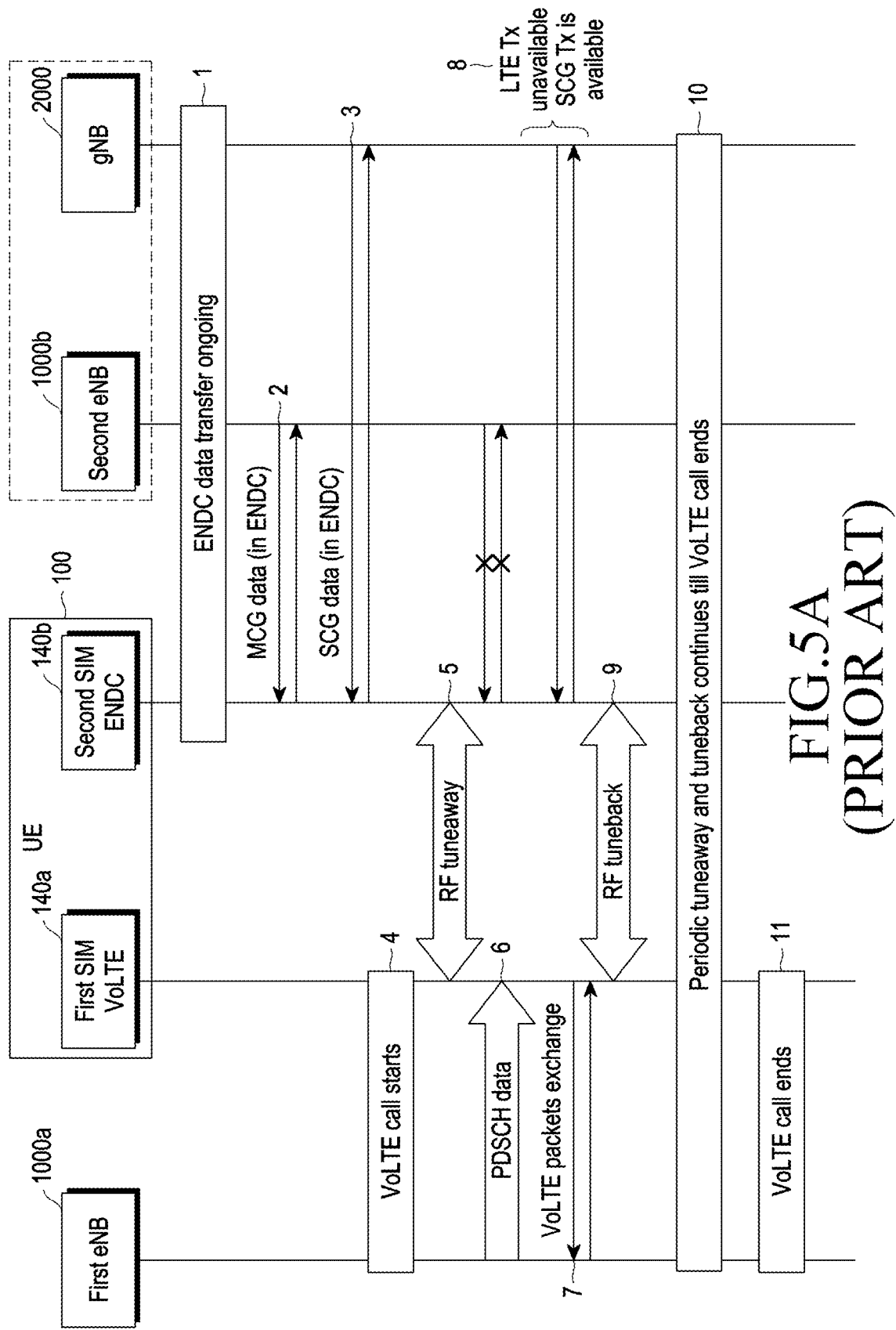
FIG. 5A is a signaling diagram illustrating a scenario of the LTE transmitter of the second SIM being unavailable during the RF tune-away, according to the prior art.

FIG. 5A is a signaling diagram illustrating a scenario of the LTE transmitter of the second SIM (140b) being unavailable during the RF tune-away, according to the prior art.

Referring to FIG. 5A, at step 1 the ENDC data transfer is ongoing on the second SIM (140b) with a second eNB (1000b) (which is the MCG cell) for the LTE leg of ENDC and with a gNB (2000) (which is the SCG cell) for the NR leg of ENDC. At step 2 the MCG data exchange (in ENDC) occurs and at step 3 the SCG data transmission (in ENDC) occurs. Since the second SIM (140b) is performing the ENDC data transfer, the data will be on both the LTE leg (the MCG data transmission) and the NR leg (the SCG data transmission). At step 4 a VoLTE call is initiated on the first SIM (140a) with a first eNB (1000a), and as a result at step 5 there is an RF tune-away of the LTE transmitter from the second SIM (140b) to the first SIM (140a). Since the VoLTE call is of higher priority, at step 6 the PDSCH data exchange and at step 7 the VoLTE packet exchange continues on the first SIM (140a). Due to the RF tune-away, at step 8 the LTE transmitter is unavailable on the second SIM (140b), but the SCG transmitter is available on the second SIM (140b). At step 9, RF tune-back occurs. At step 10, the periodic tune-away and tune-back continues until the VoLTE call ends. At step 11, the VoLTE call ends. As a result, SCG (LTE leg) ENDC data packets are lost during the tune-away.

Figure 5B:
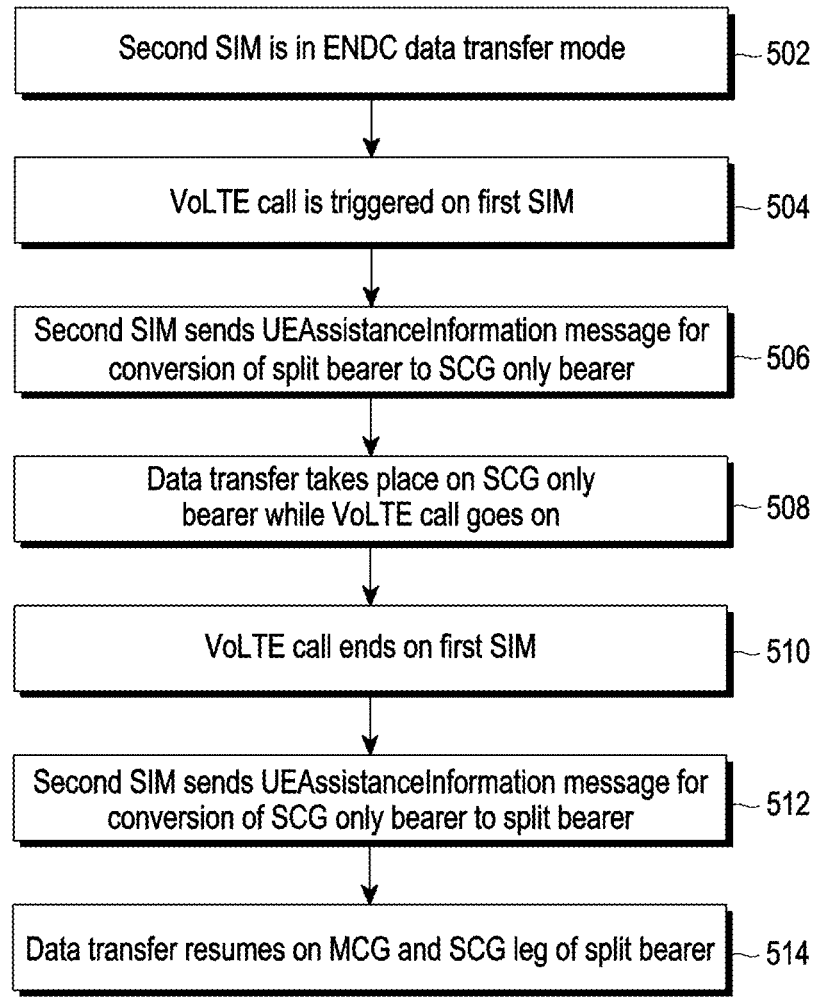
FIG. 5B is a flow chart illustrating a method for UE assisted conversion of a split bearer configuration to an SCG-only bearer configuration during the RF tune-away, according to the embodiments as disclosed herein.

FIG. 5B is a flow chart illustrating a method for UE assisted conversion of the split bearer configuration to the SCG-only bearer configuration during the RF tune-away, according to the embodiments as disclosed herein.

Referring to FIG. 5B, at step 502 the second SIM (140b) is in ENDC data transfer mode. At step 504, the VoLTE call is triggered on the first SIM (140a). At step 506, the second SIM (140b) sends a UEAssistanceInformation message to the network for conversion of the split bearer to the SCG-only bearer. At step 508, data transfer on the second SIM (140b) takes place on the SCG-only bearer while the VoLTE call goes on in the first SIM (140a). At step 510, the VoLTE call ends on the first SIM (140a). At step 512, the second SIM (140b) sends a UEAssistanceInformation message to the network for conversion of the SCG-only bearer to the split bearer. Further, at step 514 onwards, the data transfer resumes on the MCG leg and the SCG leg of the split bearer in the second SIM (140b).

Figure 5C:
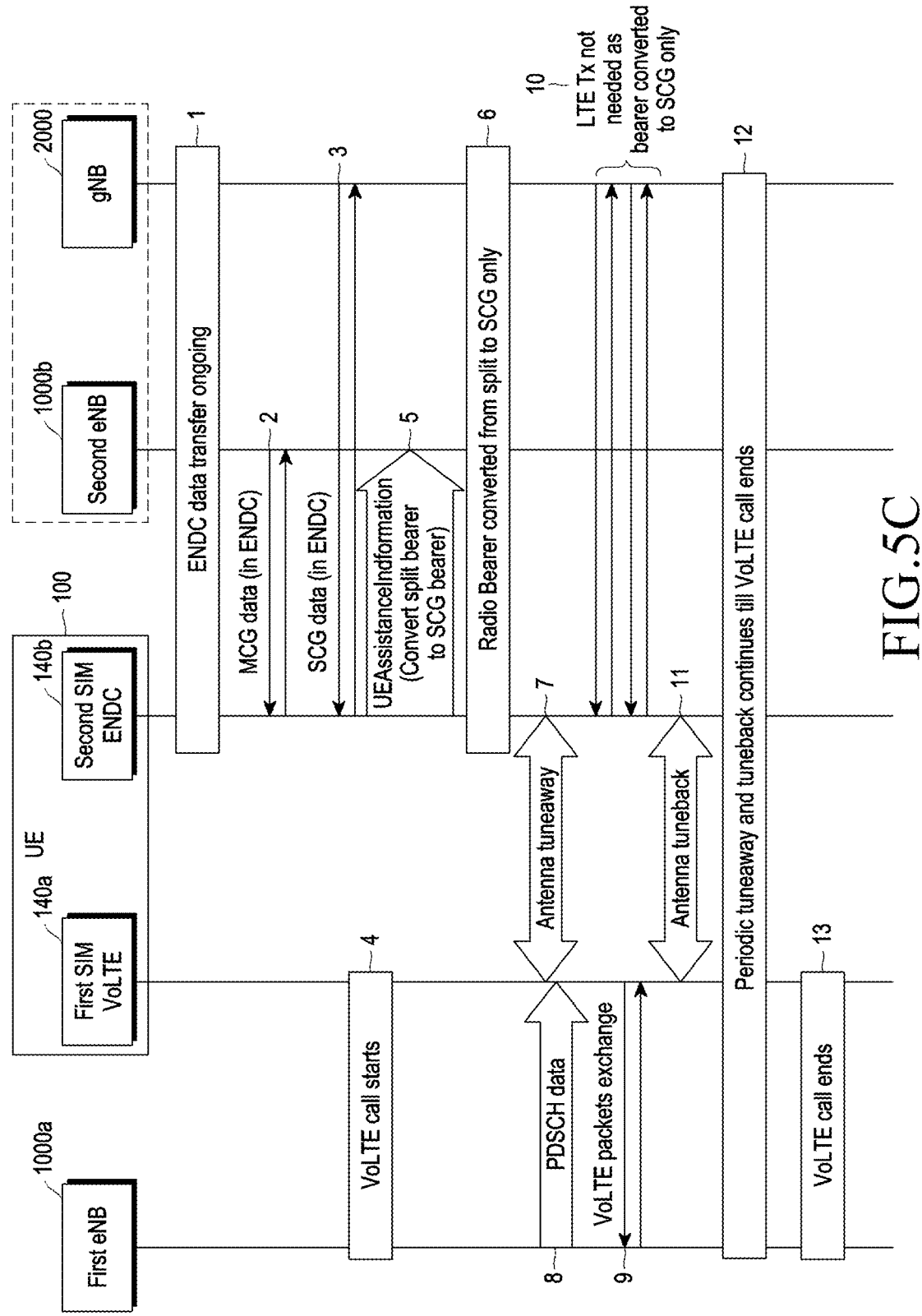
FIG. 5C is a signaling diagram illustrating a scenario of UE assisted conversion of the split bearer configuration to the SCG-only bearer configuration during the RF tune-away, according to the embodiments as disclosed herein.

FIG. 5C is a signaling diagram illustrating a scenario of UE assisted conversion of the split bearer configuration to the SCG-only bearer configuration during the tune-away, according to the embodiments as disclosed herein.

Referring to FIG. 5C in conjunction with FIG. 5A, steps 1 to 4 in FIG. 5C are substantially the same as steps 1 to 4 in FIG. 5A, and hence repeated description is omitted.

Referring to FIG. 5C, at step 5, the multi SIM UE (100) initiates conversion of the split bearer to the SCG-only bearer when the VoLTE call is ongoing on the first SIM (140a) by sending a UEAssistanceInformation message to the network (e.g., to the MCG). At step 6, based on the UEAssistanceInformation message, the network converts the radio bearer from the split configuration to the SCG-only configuration. Accordingly, the multi SIM UE (100) will use the NR (5G) transmitter of the second SIM (140b) for sending and receiving data while the VoLTE session is ongoing on the first SIM (140a). At step 7, RF tune-away is initiated in response to the VoLTE call being initiated. At step 8 the PDSCH data exchange and at step 9 the VoLTE packet exchange continues on the first SIM (140a).

At step 10, as a result of the conversion of the radio bearer to the SCG-only configuration, the ENDC data transfer will occur on the SCG bearer and no data loss will be experienced in the LTE leg during the tune-away. This will improve the throughput for the second SIM (140b) (i.e., the ENDC SIM) and will reduce network resource wastage.

Steps 11 and 12 are substantially similar to steps 9 and 10 of FIG. 5A. At step 13, the VoLTE call ends. Once the multi SIM UE (100) determines that the VoLTE call is ended after step 13, the radio bearer may be converted back to the split bearer by sending the UEAssistanceInformation message to the network again.

Further, the contents of the UEAssistanceInformation may be as follows:

| | |
|---|---|
| UEAssistanceInformation ::= | SEQUENCE { |
| criticalExtensions | CHOICE { |
| ueAssistanceInformation | UEAssistanceInformation-IEs, |
| criticalExtensionsFuture | SEQUENCE { } |
| } | |
| } | |
| UEAssistanceInformation-IEs ::= | SEQUENCE { |
| delayBudgetReport OPTIONAL, | DelayBudgetReport |
| lateNonCriticalExtension OPTIONAL, | OCTET STRING |
| nonCriticalExtension OPTIONAL | UEAssistanceInformation-v1540-IEs |

```
}
UEAssistanceInformation-v1540-IEs ::= SEQUENCE {
   overheatingAssistance                            OverheatingAssistance
OPTIONAL,
   nonCriticalExtension                             UEAssistanceInformation-v1610-IEs
OPTIONAL
}
   UEAssistanceInformation-v1610-IEs ::= SEQUENCE {
      idc-Assistance-r16                            IDC-Assistance-r16
OPTIONAL,
      drx-Preference-r16                            DRX-Preference-r16
OPTIONAL,
      maxBW-Preference-r16                          MaxBW-Preference-r16
OPTIONAL,
      maxCC-Preference-r16                          MaxCC-Preference-r16
OPTIONAL,
      maxMIMO-LayerPreference-r16                   MaxMIMO-LayerPreference-r16
OPTIONAL,
      minSchedulingOffsetPreference-r16             MinSchedulingOffsetPreference-r16
OPTIONAL,
      releasePreference-r16                         ReleasePreference-r16
OPTIONAL,
      sl-UE-AssistanceInformationNR-r16             SL-UE-AssistanceInformationNR-r16
OPTIONAL,
      referenceTimeInfoPreference-r16                                      BOOLEAN
OPTIONAL,
      nonCriticalExtension       UEAssistanceInformation-v1710-IEs    OPTIONAL
   }
   UEAssistanceInformation-vXX10-IEs ::=              SEQUENCE {
   DRBbearerPreference-rXX         bearerPreference-rXX
OPTIONAL,
      nonCriticalExtension     SEQUENCE { } OPTIONAL
}
bearerPreference-rXX ::= SEQUENCE {
DRBbearer-rXX ENUMERATED {MCG, SCG, SPLIT},
}
```

Also, a new IE "DRBbearerPreference-rXX" is included within the UEAssistanceInformation message to achieve the bearer conversion.

Figure 6A:
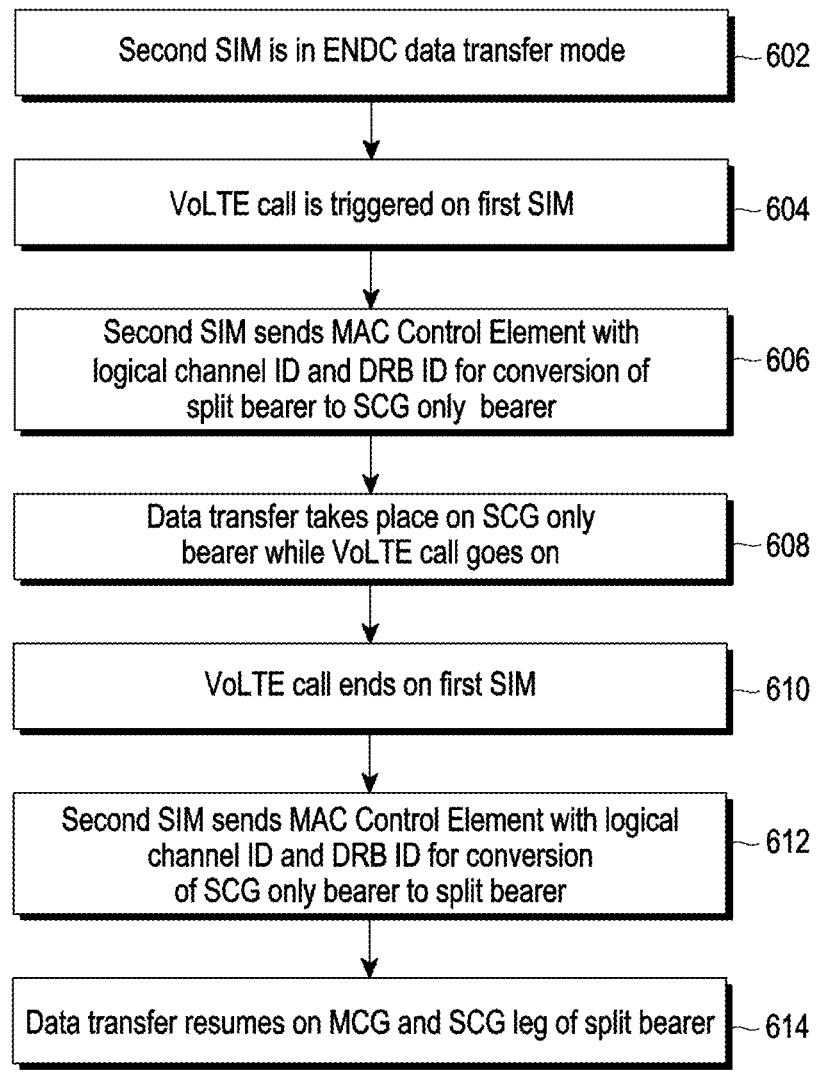
FIG. 6A is a flow chart illustrating a method for MAC CE assisted conversion of the split bearer configuration to the SCG-only bearer configuration during the RF tune-away, according to the embodiments as disclosed herein.

FIG. 6A is a flow chart illustrating a method for MAC CE assisted conversion of the split bearer configuration to the SCG-only bearer configuration during the RF tune-away, according to the embodiments as disclosed herein.

Referring to FIG. 6A, at step 602 the second SIM (140b) is in the ENDC data transfer mode. At step 604, the VoLTE call is triggered on the first SIM (140a). At step 606, the second SIM (140b) sends the MAC CE to the network for the conversion of the split bearer to the SCG-only bearer. At step 608, the data transfer on the second SIM (140b) takes place on the SCG-only bearer while the VoLTE call goes on in the first SIM (140a). At step 610, the VoLTE call ends on first SIM (140a). At step 612, the second SIM (140b) sends the MAC CE again to the network for the conversion of the SCG-only bearer to the split bearer. Further, at step 614 onwards, the data transfer resumes on the MCG leg and the SCG leg of the split bearer.

Figure 6B:
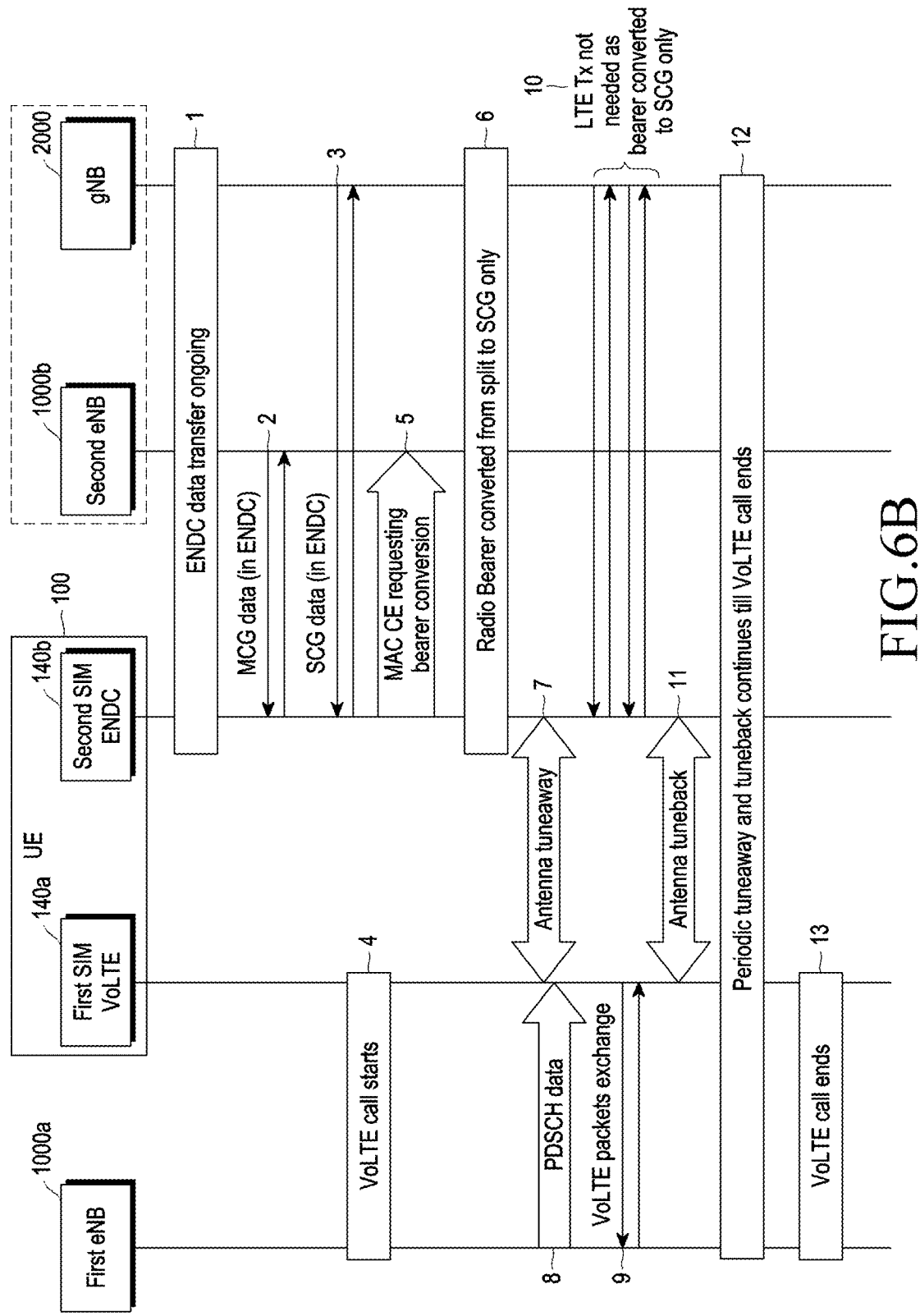
FIG. 6B is a signaling diagram illustrating a scenario of MAC CE assisted conversion of the split bearer configuration to the SCG-only bearer configuration during the RF tune-away, according to the embodiments as disclosed herein.

FIG. 6B is a signaling diagram illustrating a scenario of MAC CE assisted conversion of the split bearer configuration to the SCG-only bearer configuration during the RF tune-away, according to the embodiments as disclosed herein.

Referring to FIG. 6B in conjunction with FIGS. 5C and 5A, steps 1 to 4 in FIG. 6B are substantially the same as steps 1 to 4 in FIGS. 5C and 5A, and hence repeated description is omitted.

At step 5, the multi SIM UE (100) initiates the conversion of the split bearer to the SCG-only bearer when the VoLTE call is ongoing on the first SIM (140a) by sending the MAC CE indicating the logical channel ID and DRB ID for which the conversion needs to be performed, along with the conversion type, to the network (e.g., to the MCG). At step 6, based on the MAC CE indicating the logical channel ID and DRB ID, the network converts the radio bearer from the split configuration to the SCG-only configuration. Accordingly, the multi SIM UE (100) will use the NR (5G) transmitter of the second SIM (140b) for sending and receiving data while the VoLTE session is ongoing on the first SIM (140a). At step 7, the RF tune-away is imitated in response to the VoLTE call being initiated. At step 8 the PDSCH data exchange and at step 9 the VoLTE packet exchange continues on the first SIM (140a).

At step 10, as a result of the conversion of the radio bearer to the SCG-only configuration, the ENDC data transfer will occur on the SCG bearer and no data loss will be experienced in the LTE leg during the tune-away. This will improve the throughput for the second SIM (140b) (i.e., the ENDC SIM) and will reduce network resource wastage.

Steps 11 and 12 are substantially similar to steps 11 and 12 of FIG. 5C and to steps 9 and 10 of FIG. 5A. At step 13, the VoLTE call ends. Once the multi SIM UE (100) determines that the VoLTE call is ended after step 13, the radio bearer may be converted back to the split bearer by sending the MAC CE to the network again.

FIG. 6C illustrates a structure of the MAC CE sent by the multi SIM UE (100) to the network for initiating the conversion of the radio bearer, according to the embodiments as disclosed herein.

Referring to FIG. 6C, the MAC CE may be defined between the multi SIM UE (100) and the network so that bearer conversion is performed. The multi SIM UE (100) indicates the bearer change for the required logical channel ID (LC ID) using the MAC CE structure.

The LCG ID indicates the LC ID, R indicates Reserved Bits, and Type indicates the required bearer type, as provided in Table 1.

TABLE 1

| Type | Bearer |
|---|---|
| 00 | SPARE |
| 01 | MCG |
| 10 | SCG |
| 11 | SPLIT |

Figure 7A:
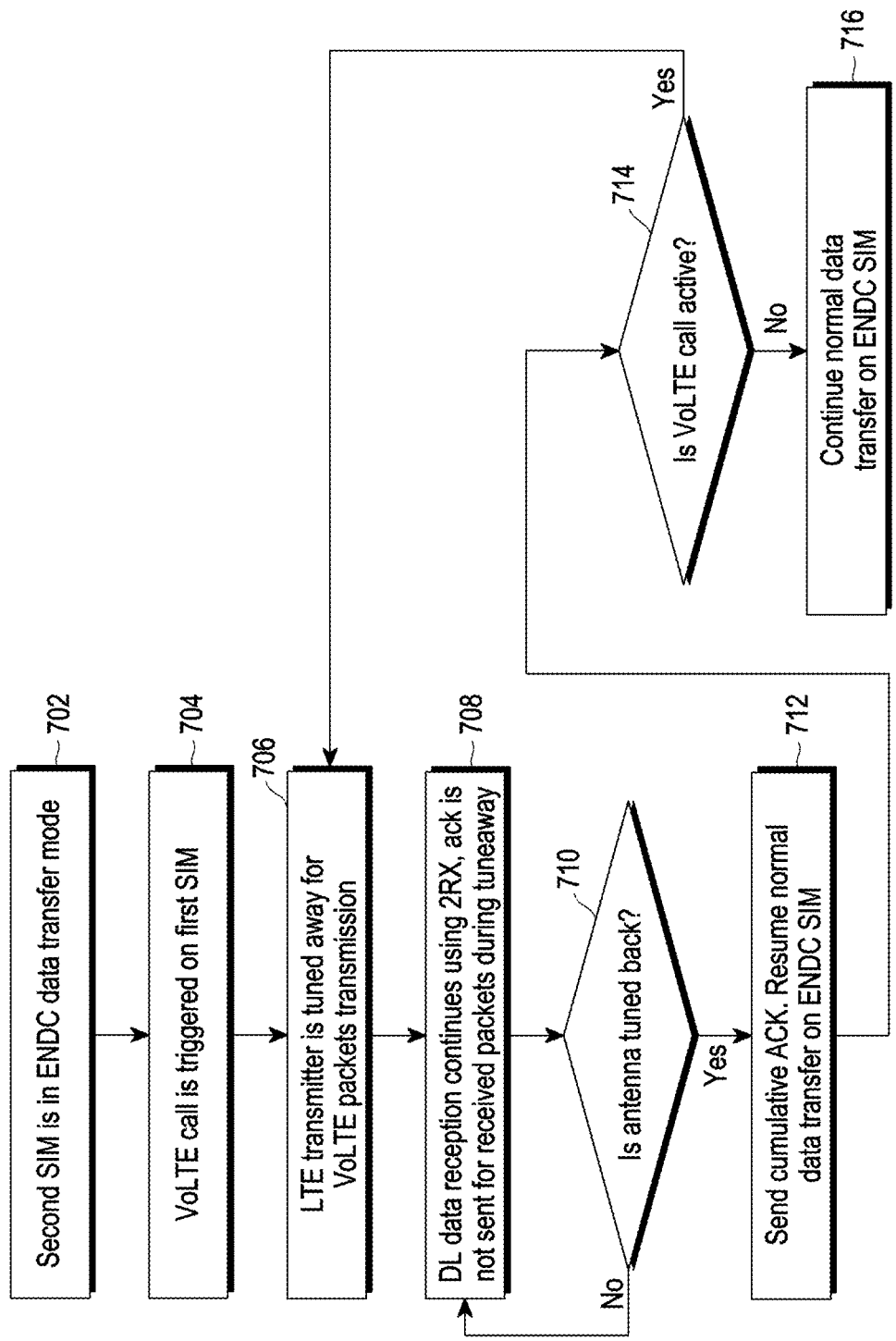
FIG. 7A is a flow chart illustrating a method for transmission of a cumulative ACK after RF tune-back, according to the embodiments as disclosed herein.

FIG. 7A is a flow chart illustrating a method for transmission of the Cumulative ACK after RF tune-back, according to the embodiments as disclosed herein.

Referring to the FIG. 7A, at step 702, the second SIM (140b) is in ENDC data transfer mode and at step 704 the VoLTE call is triggered on the first SIM (140a). At step 706, the LTE transmitter of the second SIM (140b) is tuned away for the transmission of the VoLTE packets on the first SIM (140a). At step 708, DL data reception continues on the LTE leg of the second SIM (140b) using one of multiple receivers (e.g., the two receivers discussed above). However, ACKs are not sent for the received data packets during the tune-away period.

At step 710, the multi SIM UE (100) determines whether the antenna is tuned back for the LTE leg of the second SIM (140b). In response to determining that the antenna is tuned back for the LTE leg of the second SIM (140b), the multi SIM UE (100) sends a cumulative ACK for all the data packets received during the tune-away period and resumes the normal ENDC data transfer on the second SIM (140b). At step 714, the multi SIM UE (100) determines whether the VoLTE call is still active. In response to determining that the VoLTE call is active, the multi SIM UE (100) loops to step 706. In response to determining that the VoLTE call is no longer active, the multi SIM UE (100) continues the normal ENDC data transfer on the second SIM (140b) at step 716.

Figure 7B:
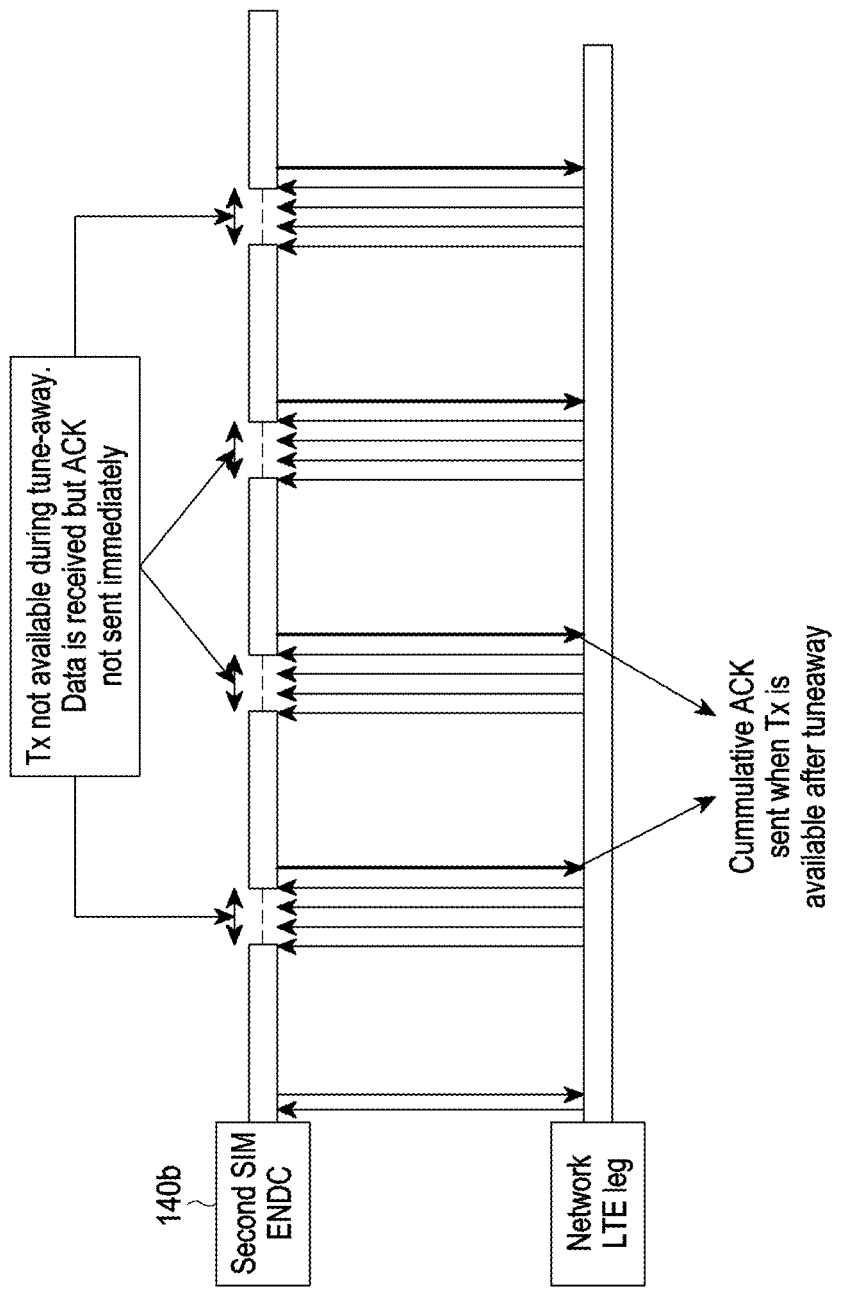
FIG. 7B illustrates a scenario of the transmission of the cumulative ACK after the RF tune-back, according to the embodiments as disclosed herein.

FIG. 7B illustrates a scenario of the transmission of the Cumulative ACK after RF tune-back, according to the embodiments as disclosed herein.

Referring to FIG. 7B, the multi SIM UE (100) includes multiple receivers (Rx), and hence the multi SIM UE (100) may receive the DL data on the LTE leg of the second SIM (140b) even when the transmitter of the second SIM (140b) is tuned away for the VoLTE call on the first SIM (140a).

Once the transmitter of the second SIM (140b) is available after the transmission of the VoLTE packets (i.e., after the tune-back) then the multi SIM UE (100) will send the cumulative ACK for the DL data packets received during the tune-away period. Due to the transmission of the cumulative ACK after the tune-back, retransmission of the data packets for which the ACKs were not received by the network is prevented. The network should be capable of accepting the cumulative ACK for the implementation of the proposed method.

Consider, for example, that during the VoLTE call, every 20 ms transmission packets are generated to be sent and similarly every 20 ms reception packets are received. Also, on average the first SIM (140a) (i.e., the VoLTE call SIM) utilizes the transmitter for an approximate time of 12 ms (which includes buffer time such as tune-away time, ACK/NACK reception, etc.) while the second SIM (140b) (i.e., the ENDC SIM) utilizes the transmitter for an approximate time of 8 ms, as shown in Table 2.

TABLE 2

| VoLTE usage | Other Stack usage |
|---|---|
| ~12 ms | ~8 ms |

Therefore, during the 12 ms period any of the DL data for the second SIM (140b) is received as the receiver of the first SIM (140a) is available. The cumulative ACK is sent for the data packets received during the tune-away time after the transmitter becomes available again for the second SIM (140b). Therefore, the proposed method ensures that the DL data reception continues even during the tune-away period, thereby increasing the DL throughput and decreasing the network resource wastage (i.e., resources used for retransmission of the DL data packets due to the tune-away).

Figure 7C:
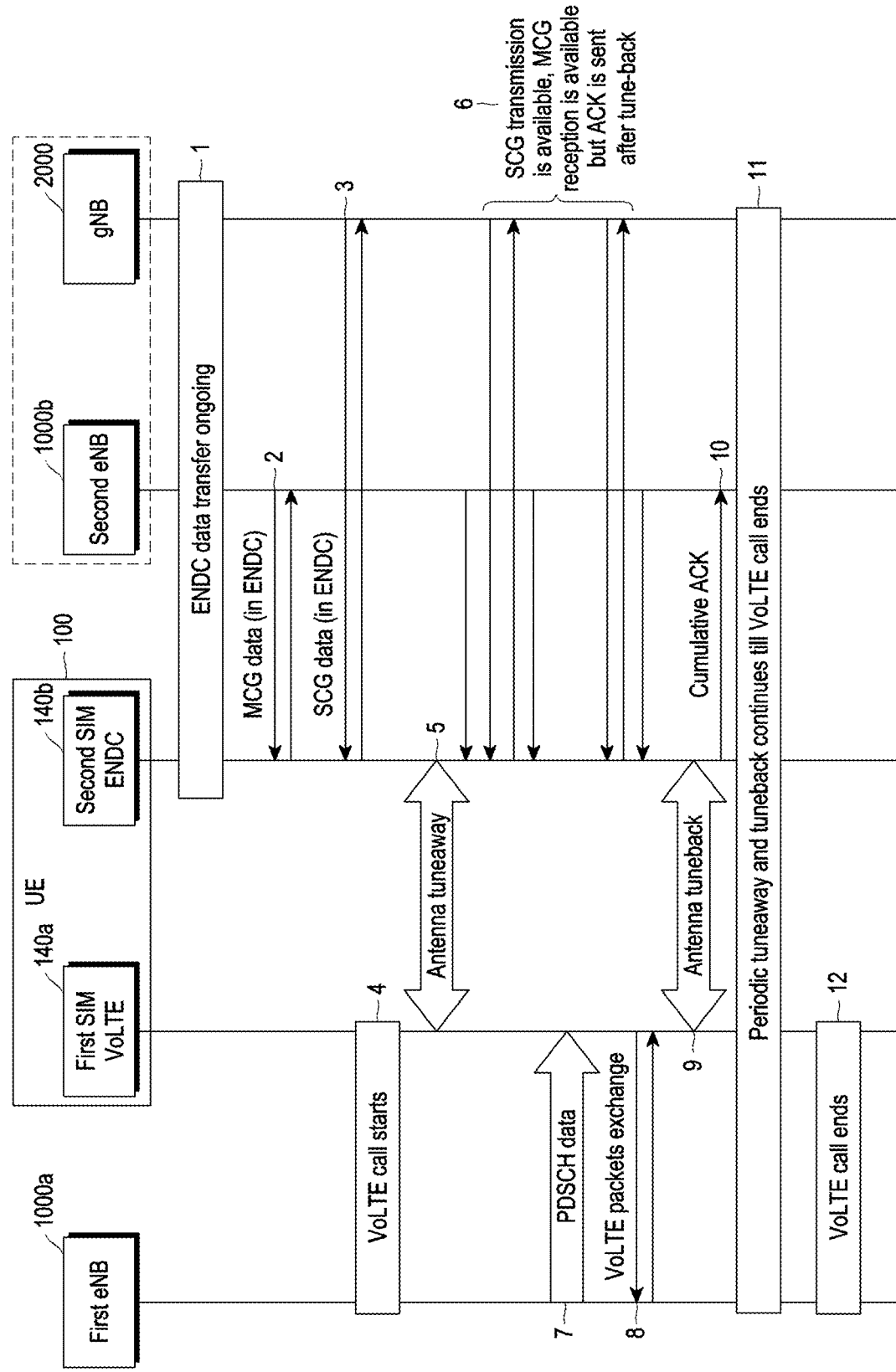
FIG. 7C is a signaling diagram illustrating a scenario of the transmission of the Cumulative ACK after the RF tune-back, according to the embodiments as disclosed herein.

FIG. 7C is a signaling diagram illustrating a scenario of transmission of the Cumulative ACK after RF tune-back, according to the embodiments as disclosed herein.

Referring to FIG. 7C in conjunction with FIG. 5A, steps 1 to 4 in FIG. 7C are substantially the same as steps 1 to 4 in FIG. 5A, and hence repeated description is omitted.

At step 5 the RF antenna tune-away period begins. At step 6, the multi SIM UE (100) determines that SCG transmission is available and MCG reception is available, but the multi SIM UE (100) does not send ACKs for MCG data received during the tune-away period. At step 9, the multi SIM UE (100) determines that the tune-back has occurred, and at step 10 sends the cumulative ACK for the data received during the tune-away period. At step 11, the periodic tune-away and tune-back continues until the VoLTE call ends (as indicated in step 12).

Figure 8A:
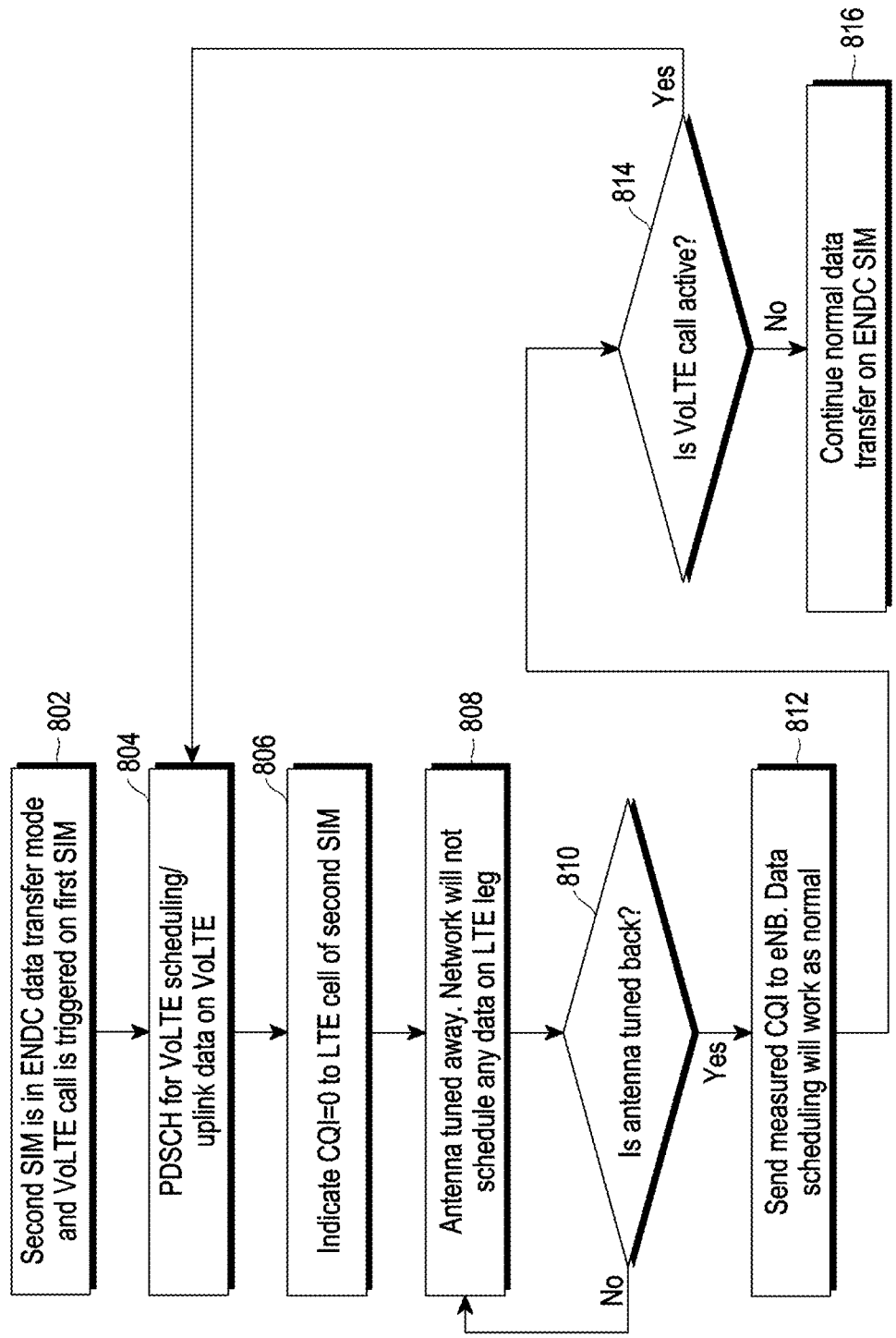
FIG. 8A is a flow chart illustrating a method of using L1 signaling for indicating the tune-away by the multi SIM UE to the network, according to the embodiments as disclosed herein.

FIG. 8A is a flow chart illustrating a method of using L1 signaling for indicating the RF tune-away by the multi SIM UE (100) to the network, according to the embodiments as disclosed herein.

Referring to FIG. 8A, at step 802, the second SIM (140b) is in ENDC data transfer mode and the VoLTE call is triggered on the first SIM (140a). At step 804, the PDSCH for the VoLTE scheduling is received or VoLTE uplink data is ready on the first SIM (140a) (i.e., the LTE SIM). At step 806, the multi SIM UE (100) indicates CQI=0, using L1 signaling, to the LTE cell (the MCG) of the second SIM (140b). At step 808, the antenna is tuned away, but the network will not schedule any data on the LTE leg of the second SIM (140b) due to the indication of CQI=0.

Further, at step 810 the multi SIM UE (100) determines whether the antenna is tuned back or not. In response to determining that the antenna is not tuned back, the multi SIM UE (100) loops to step 808. In response to determining that the antenna is tuned back, at step 812 the multi SIM UE (100) sends the measured CQI to the eNB, and data scheduling on the LTE leg of the second SIM (140b) will work as normal. Further, at step 814, the multi SIM UE (100) determines whether the VoLTE call is still active or not. In response to determining that the VoLTE call is still active, the multi SIM UE (100) loops to step 804. At step 816, in response to determining that the VoLTE call is not active the multi SIM UE (100) continues the normal data transfer on the second SIM (140b) (i.e., the ENDC SIM).

Figure 8B:
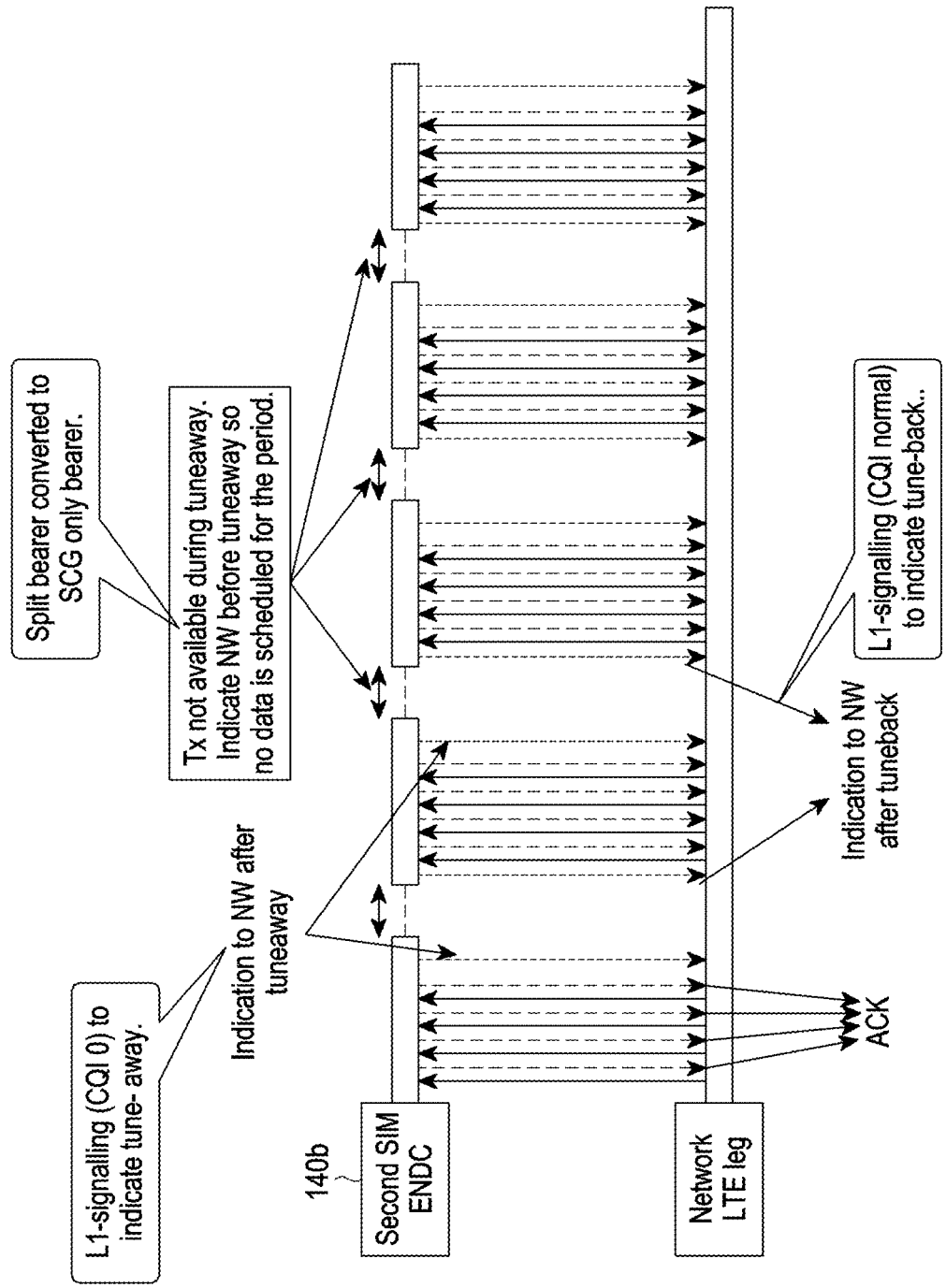
FIG. 8B illustrates a scenario of use of using L1 signaling for indicating the RF tune-away by the multi SIM UE to the network, according to the embodiments as disclosed herein.

FIG. 8B illustrates a scenario of use of the L1 signaling for indicating the tune-away by the multi SIM UE (100) to the network, according to the embodiments as disclosed herein.

Referring to FIG. 8B, consider that a VoLTE call is ongoing on the first SIM (140a) and an ENDC data session is ongoing on the second SIM (140b). Accordingly, periodically the transmitter of the second SIM (140b) will be tuned-away for VoLTE packet transmissions.

In order to avoid the loss of LTE leg DL data packets during the tune-away period, the multi SIM UE (100) uses L1 signaling to indicate the start of the tune-away period to the network so that no LTE leg DL data is scheduled during the tune-away period by the network. Further, the multi SIM UE (100) determines that the tune-back has occurred when the RF transmitter is free, and then sends an indication to the network to resume the data transmission.

In the proposed method, the multi SIM UE (100) sets the CQI to a preset value (e.g 0) (L1 signaling) to indicate the RF tuning away for the VoLTE packets send/receive. Based on the CQI=0 indication received from the multi SIM UE (100), the network will not send any data on the LTE leg of the second SIM (140b) during the tuned-away period.

Once the RF transmitter is available (after the tune-back) to the second SIM (140b), the multi SIM UE (100) reports the CQI measurements as usual, indicating the RF availability for the LTE data reception/transmission in the second SIM (140b), so that the normal data scheduling is performed on the LTE leg of the second SIM (140b). Therefore, by setting the CQI to the preset value (e.g 0), the multi SIM UE (100) implicitly requests the network to convert the split bearer to the SCG-only bearer for the tune-away period. Accordingly, for the second SIM (140b) the network will schedule data only on the 5G NR SCG leg during the tune-away.

Once the CQI is reported as normal for the LTE leg of the second SIM (140b), the network will schedule the data on the LTE leg of the second SIM (140b). Therefore, the proposed method quickly and accurately switches the bearer and data scheduling from the split configuration to the SCG-only configuration.

Figure 8C:
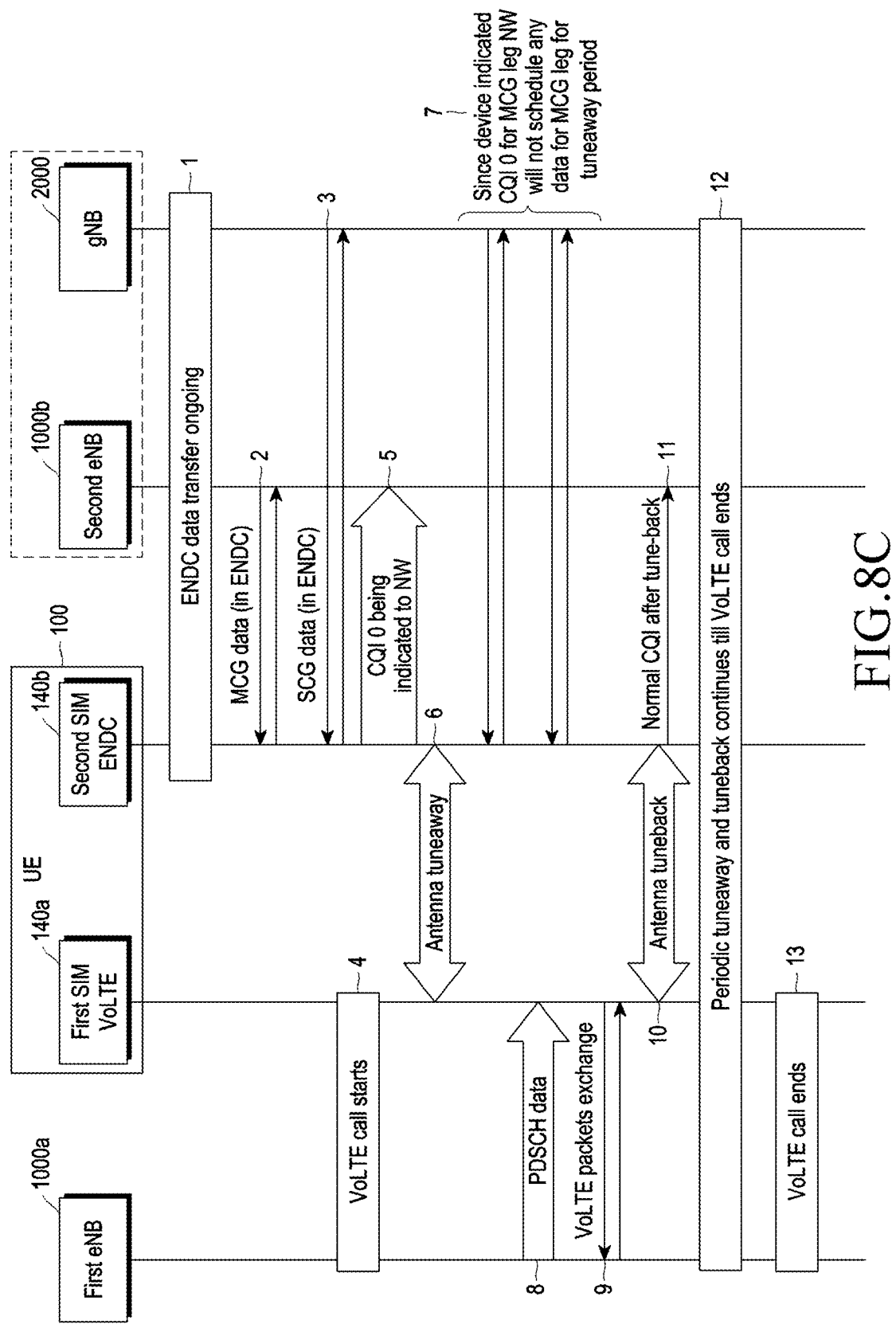
FIG. 8C is a signaling diagram illustrating a scenario for indicating the tune-away by the multi SIM UE to the network using L1 signaling, according to the embodiments as disclosed herein.

FIG. 8C is a signaling diagram illustrating a scenario for indicating the RF tune-away by the multi SIM UE (100) to the network using L1 signaling, according to the embodiments as disclosed herein.

Referring to FIG. 8C in conjunction with FIG. 5A, steps 1 to 4 in FIG. 8C are substantially the same as steps 1 to 4 in FIG. 5A, and hence repeated description is omitted.

At step 5, when PDSCH for VoLTE scheduling is received, or VoLTE uplink data is ready to transmit, the second SIM (140b) sends a CSI report indicating CQI=0 to the network (e.g., to the MCG), which functions as an indication of RF tune-away to the network.

At step 6, the period of the RF tune-away begins. At step 7, since the multi SIM UE (100) indicated CQI=0 for the MCG (LTE) leg, the network will not schedule any data for the MCG leg for the tune-away period. At step 8 the PDSCH data exchange and at step 9 the VoLTE packet exchange continues on the first SIM (140a). At step 10, the RF tune-back occurs. At step 11, the multi sim UE (100) sends a normal CSI report to the network, indicating measured CQI values. As a result, the network will resume scheduling data for the MCG leg after the tune-back occurs. At step 12, the periodic tune-away-tune-back continues until the VoLTE call ends. At step 13, the VoLTE call ends.

Figure 9:
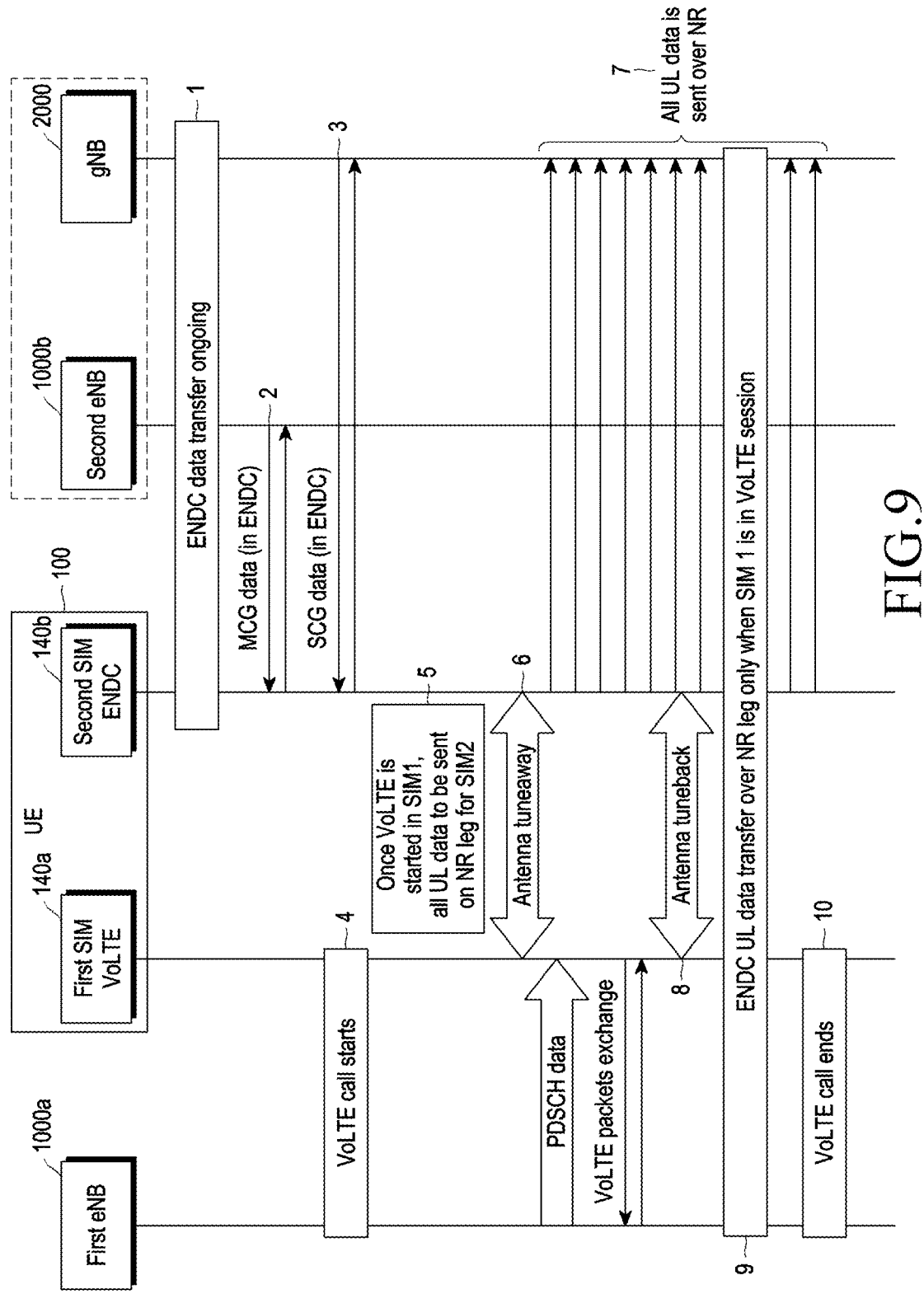
FIG. 9 is a signaling diagram illustrating a scenario of managing data sessions of the multi SIM UE during uplink data transfer, according to the embodiments as disclosed herein.

FIG. 9 is a signaling diagram illustrating a scenario of managing the data sessions of the multi SIM UE (100) during uplink data transfer, according to the embodiments as disclosed herein.

Referring to the FIG. 9, the first SIM (140a) is in a VoLTE call (step 4) and the second SIM (140b) is in an ENDC data session (step 1). Accordingly, periodically the LTE Tx will be tuned-away from the second SIM (140b) for VoLTE packet transmission (as indicated by step 6). In the second SIM (140b), if an uplink threshold is configured with a value that is anything apart from "infinity" then the UL data will be sent using the LTE leg of the second SIM (140b) along with the NR leg of the second SIM (140b).

In general, when the first SIM (140a) is in a VoLTE call and the second SIM (140b) is in a data session, the NR Tx will always be available for the transmission of the data packets. According to the proposed method, the multi SIM UE (100) should send the UL data through the NR leg only (step 7). The uplink split bearer is converted to the SCG-only bearer internally. Therefore, the UL data transfer is minimally impacted when the uplink split bearer is converted to the SCG-only bearer.

Further, all the ACK/NACKs for the UL data will be handled by the NR leg of the ENDC second SIM (140b), and therefore the transmission of data will not be impacted due to periodic tune-away of the LTE Tx for VoLTE packet transmission. The multi SIM UE (100) is implicitly converting the UL Split bearer to SCG-only bearer for the duration of the VoLTE call.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for managing a data session of a user equipment (UE) using multiple subscriber identity modules (SIMs) in a dual-connectivity wireless network, comprising:

identifying, by the UE, initiation of a voice call over a first network on a first SIM while at least one data session is ongoing over the first network on a second SIM, the first SIM being connected with the first network and the second SIM being connected with the first network and a second network included in the dual-connectivity wireless network;

shifting, by the UE, the at least one data session on the second SIM from the first network to the second network, in response to identifying that the voice call over the first network on the first SIM is initiated;

identifying, by the UE, whether the voice call over the first network initiated on the first SIM is ended; and shifting, by the UE, the at least one data session on the second SIM from the second network to the first network, in response to identifying that the voice call over the first network initiated on the first SIM is ended, wherein shifting, by the UE, the at least one data session on the second SIM from the first network to the second network, in response to identifying that the voice call over the first network on the first SIM is initiated, comprises:

sending, by the UE, a request to a master cell group (MCG) entity of the first network to convert at least one of an uplink (UL) split bearer configuration or a downlink (DL) split bearer configuration to a secondary cell group (SCG)-only bearer configuration;

determining, by the UE, the at least one of the UL split bearer configuration or the DL split bearer configuration is converted to the SCG-only bearer configuration in response to sending the request; and shifting, by the UE, the at least one data session on the second SIM from the first network to the second network for sending and receiving data of the at least one data session during the voice call over the first network on the first SIM.

2. The method of claim 1, wherein the first network is a $4^{th}$ generation (4G) network and the second network is a $5^{th}$ generation (5G) network, and wherein the second SIM is connected to the 4G network as a master cell group (MCG) and the second SIM is connected to the 5G network as a secondary cell group (SCG).

3. The method of claim 1, wherein a $4^{th}$ generation (4G) transmitter of the UE is used in association with the first SIM and the second SIM, and a $5^{th}$ generation (5G) transmitter of the UE is used in association with the second SIM.

4. The method of claim 1, wherein the request is one of a UEAssistanceInformation message or a medium access control (MAC) control element (CE) with a logical control identifier (ID) and a data radio bearer (DRB) ID.

5. The method of claim 1, wherein shifting, by the UE, the at least one data session on the second SIM from the second network to the first network, in response to identifying that the voice call over the first network initiated on the first SIM is ended comprises:

identifying, by the UE, one or more downlink data packets received during the voice call that causes a periodic transceiver tune-away; and sending, by the UE, a cumulative acknowledgement for the received one or more downlink data packets and shifting the at least one data session on the second SIM from the second network to the first network, in response to identifying that the voice call over the first network on the first SIM is ended.

6. The method of claim 1, wherein shifting, by the UE, the at least one data session on the second SIM from the first network to the second network, in response to identifying that the voice call over the first network on the first SIM is initiated, comprises:

sending, by the UE to a master cell group (MCG) entity of the first network, an indication of radio frequency (RF) tuning away; and shifting, by the UE, the at least one data session on the second SIM from the first network to the second network for sending and receiving data of the at least one data session during the voice call over the first network on the first SIM.

7. The method of claim 6, wherein the indication of RF tuning away is a channel state information (CSI) report indicating the RF tuning away.

8. The method of claim 7, wherein the CSI report indicating the RF tuning away is sent using an L1 signaling with a channel quality indicator (CQI) value set to a preset value.

9. The method of claim 6, further comprising:

sending, by the UE to a master cell group (MCG) entity of the first network, an indication of RF tuning back during the voice call over the first network on the first SIM; and shifting, by the UE, the at least one data session on the second SIM from the second network to the first network after sending the indication of the RF tuning back.

10. A user equipment (UE) for managing a data session using multiple subscriber identity modules (SIMs) in a dual-connectivity wireless network, the UE comprises:

a transceiver; and at least one processor coupled to the transceiver, and configured to:

identify initiation of a voice call over a first network on a first SIM while at least one data session is ongoing over the first network on a second SIM, the first SIM being connected with the first network and the second SIM being connected with the first network and a second network included in the dual-connectivity wireless network, shift the at least one data session on the second SIM from the first network to the second network, in response to an identification that the voice call over the first network on the first SIM is initiated, identify whether the voice call over the first network initiated on the first SIM is ended, and shift the at least one data session on the second SIM from the second network to the first network, in response to an identification that the voice call over the first network initiated on the first SIM is ended, wherein the at least one processor is further configured to:

send a request to a master cell group (MCG) entity of the first network to convert at least one of an uplink (UL) split bearer configuration or a downlink (DL) split bearer configuration to a secondary cell group (SCG)-only bearer configuration, determine the at least one of the UL split bearer configuration or the DL split bearer configuration is converted to the SCG-only bearer configuration in response to sending the request; and shift the at least one data session on the second SIM from the first network to the second network for sending and receiving data of the at least one data session during the voice call over the first network on the first SIM.

11. The UE of claim 10, wherein the first network is a $4^{th}$ generation (4G) network and the second network is a $5^{th}$ generation (5G) network, and wherein the second SIM is connected to the 4G network as a master cell group (MCG) and the second SIM is connected to the 5G network as a secondary cell group (SCG).

12. The UE of claim 10, wherein the transceiver comprises a $4^{th}$ generation (4G) transmitter used in association with the first SIM and the second SIM, and a $5^{th}$ generation (5G) transmitter used in association with the second SIM.

13. The UE of claim 10, wherein the request is one of a UEAssistanceInformation message, a channel state information (CSI) report indicating RF tuning away, or a medium access control (MAC) control element (CE) with a logical control identifier (ID) and a data radio bearer (DRB) ID.

14. The UE of claim 10, wherein the at least one processor is further configured to:

identify one or more downlink data packets received during the voice call that cause a periodic transceiver tune-away, and control the transceiver to send a cumulative acknowledgement for the one or more downlink data packets and shift the at least one data session on the second SIM from the second network to the first network, in response to the identification that the voice call over the first network on the first SIM is ended.

15. The UE of claim 10, wherein the at least one processor is further configured to:
control the transceiver to send, to a master cell group (MCG) entity of the first network, an indication of RF tuning away, and
shift the at least one data session on the second SIM from the first network to the second network for sending and receiving data of the at least one data session during the voice call over the first network on the first SIM.

16. The UE of claim 15, wherein the indication of RF tuning away is a channel state information (CSI) report indicating the RF tuning away.

17. The UE of claim 16, wherein the CSI report indicating the RF tuning away is sent using an L1 signaling with a channel quality indicator (CQI) value set to a preset value.

18. The UE of claim 17, wherein the at least one processor is further configured to:
send, to a master cell group (MCG) entity of the first network, an indication of RF tuning back during the voice call over the first network on the first SIM, and
shift the at least one data session on the second SIM from the second network to the first network after the indication of the RF tuning back is sent.

* * * * *